US012583220B2

(12) United States Patent
Hasegawa et al.

(10) Patent No.: US 12,583,220 B2
(45) Date of Patent: Mar. 24, 2026

(54) LIQUID DISCHARGE APPARATUS AND LIQUID DISCHARGE METHOD

(71) Applicant: SEIKO EPSON CORPORATION, Tokyo (JP)

(72) Inventors: Ryo Hasegawa, Matsumoto (JP); Kazuhiro Ochi, Nagano (JP)

(73) Assignee: SEIKO EPSON CORPORATION (JP)

( * ) Notice: Subject to any disclaimer, the term of this patent is extended or adjusted under 35 U.S.C. 154(b) by 148 days.

(21) Appl. No.: 18/591,534

(22) Filed: Feb. 29, 2024

(65) Prior Publication Data

US 2024/0294008 A1 Sep. 5, 2024

(30) Foreign Application Priority Data

Mar. 1, 2023 (JP) ................................ 2023-030799

(51) Int. Cl.
*B41J 2/045* (2006.01)

(52) U.S. Cl.
CPC ....... *B41J 2/04588* (2013.01); *B41J 2/04563* (2013.01); *B41J 2/04573* (2013.01); *B41J 2/04581* (2013.01)

(58) Field of Classification Search
CPC .. B41J 2/04588; B41J 2/0459; B41J 2/04591; B41J 2/04581; B41J 2/04595
See application file for complete search history.

(56) References Cited

U.S. PATENT DOCUMENTS 6,488,349 B1 12/2002 Matsuo et al.
2022/0305773 A1* 9/2022 Otani .................. B41J 2/04541

FOREIGN PATENT DOCUMENTS

JP 2001-146011 A 5/2001
JP 6820704 B2 * 1/2021 .......... B41J 2/04586

* cited by examiner

*Primary Examiner* — Julian D Huffman
(74) *Attorney, Agent, or Firm* — Harness, Dickey & Pierce, P.L.C.

(57) ABSTRACT

A liquid discharge apparatus includes a discharge section having a driving element that is driven with a driving signal. When the temperature detected by the temperature detector is a first temperature, the driving signal includes a first driving waveform. The first driving waveform includes within one cycle, N number of first discharge pulses and N−1 number of first connection components each connecting two adjacent first discharge pulses where N is not less than three. Each of the N number of first discharge pulses is a pulse whose potential changes to effect a change in a pressure of liquid within a pressure chamber such that a liquid droplet can be discharged from a nozzle. Each of the N−1 number of first connection components is a component maintained at a constant potential for a time period longer than or equal to 0.6 times a natural vibration period of the pressure chamber.

11 Claims, 9 Drawing Sheets

FIG. 8

TBL

| TEMPERATURE | WAVEFORM SPECIFYING SIGNAL |
| --- | --- |
| ... | ... |
| 22 [°C] | dCom-PX |
| ... | ... |
| 35 [°C] | dCom-PY |
| ... | ... |

FIG. 9

<table>
<tr><td></td><td>FIRST EXAMPLE</td><td>SECOND EXAMPLE</td></tr>
<tr><td>TEMPERATURE</td><td>22 [°C]</td><td>22 [°C]</td></tr>
<tr><td>CONNECTION COMPONENT SCX1</td><td>0.9・Tc</td><td>0.9・Tc</td></tr>
<tr><td>CONNECTION COMPONENT SCX2</td><td>0.9・Tc</td><td>0.8・Tc</td></tr>
<tr><td>FLYING STATE</td><td>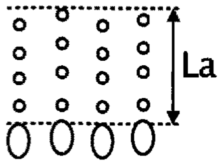

DRa</td><td>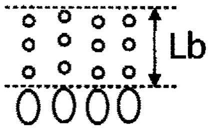

DRb</td></tr>
<tr><td></td><td>THIRD EXAMPLE</td><td>COMPARATIVE EXAMPLE</td></tr>
<tr><td>TEMPERATURE</td><td>35 [°C]</td><td>35 [°C]</td></tr>
<tr><td>CONNECTION COMPONENT SCY1</td><td>0.7・Tc</td><td>0.9・Tc</td></tr>
<tr><td>CONNECTION COMPONENT SCY2</td><td>0.9・Tc</td><td>0.8・Tc</td></tr>
<tr><td>FLYING STATE</td><td>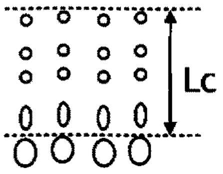

DRc</td><td>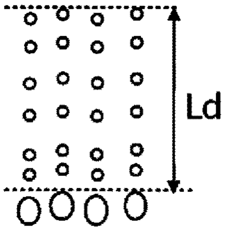

DRd</td></tr>
</table>

FIG. 12

| | SdA [m] | Tcu1 | Tcu2 | Tcu3 |
|---|---|---|---|---|
| DRIVING MODE α1 | (1,1) | H | H | H |
| DRIVING MODE α2 | (0,1) | L | H | H |
| DRIVING MODE α3 | (0,0) | L | L | L |

LIQUID DISCHARGE APPARATUS AND LIQUID DISCHARGE METHOD

The present application is based on, and claims priority from JP Application Serial Number 2023-030799, filed Mar. 1, 2023, the disclosure of which is hereby incorporated by reference herein in its entirety.

BACKGROUND

1. Technical Field

The present disclosure relates to a liquid discharge apparatus and a liquid discharge method.

2. Related Art

Liquid discharge apparatuses have been widely used which include a nozzle discharging liquid, a pressure chamber communicating with the nozzle, and a driving element changing the pressure of liquid within the pressure chamber according to a driving signal and that discharge liquid onto a medium. For example, JP-A-2001-146011 discloses a liquid discharge apparatus that generates a driving signal including plural discharge pulses based on the natural vibration period of the pressure chamber in order to improve the discharge performance. The discharge pulses are pulses whose potentials change to effect a change in the pressure of liquid within the pressure chamber such that the liquid can be discharged from the nozzle.

However, even when the driving signal including plural discharge pulses is generated based on the natural vibration period of the pressure chamber and the generated driving signal is supplied to the driving element like the aforementioned technique in the related art, deterioration of the discharge performance sometimes degrades the quality of an image formed on the medium.

SUMMARY

A liquid discharge apparatus according to an aspect of the present disclosure includes: a liquid discharge head including a discharge section having: a nozzle discharging liquid as a liquid droplet; a pressure chamber communicating with the nozzle; and a driving element that is configured to effect a change in a pressure of the liquid within the pressure chamber according to a driving signal; a driving signal generator generating the driving signal; and a temperature detector detecting temperature, in which when the temperature detected by the temperature detector is a first temperature, the driving signal includes a first driving waveform that is configured to be supplied to the driving element when the temperature detected by the temperature detector is the first temperature, the first driving waveform includes within one cycle, N number of first discharge pulses arranged chronologically and N−1 number of first connection components each connecting two adjacent first discharge pulses among the N number of first discharge pulses where N is not less than three, each of the N number of first discharge pulses is a pulse whose potential changes to effect a change in the pressure of the liquid within the pressure chamber such that the liquid droplet can be discharged from the nozzle, and each of the N−1 number of first connection components is a component maintained at a constant potential for a time period longer than or equal to 0.6 times a natural vibration period of the pressure chamber.

A liquid discharge method according to another aspect of the present disclosure is a liquid discharge method of a liquid discharge apparatus including: a liquid discharge head including a discharge section having a nozzle discharging liquid as a liquid droplet, a pressure chamber communicating with the nozzle, and a driving element effecting a change in a pressure of the liquid within the pressure chamber according to a driving signal; a driving signal generator generating the driving signal; a temperature detector detecting temperature; and a controller controlling the driving signal generator, the liquid discharge method including: causing the controller to acquire temperature information indicating the temperature from the temperature detector; and causing the controller to cause the driving signal generator to generate the driving signal including a first driving waveform that is to be supplied to the driving element when the temperature indicated by the temperature information is a first temperature, in which the first driving waveform includes, within one cycle, N number of first discharge pulses arranged chronologically and N−1 number of first connection components each connecting two adjacent first discharge pulses among the N number of first discharge pulses where N is not less than three, each of the N number of first discharge pulses is a pulse whose potential changes to effect a change in the pressure of the liquid within the pressure chamber such that the liquid droplet can be discharged from the nozzle, and each of the N−1 number of first connection components is a component maintained at a constant potential for a time period longer than or equal to 0.6 times a natural vibration period of the pressure chamber.

BRIEF DESCRIPTION OF THE DRAWINGS

FIG. 8 is a diagram illustrating an example of a waveform specifying signal management table.

FIG. 9 is a diagram for explaining ink droplet shapes in a first example, a second example, a third example, and a comparative example.

FIG. 12 is a diagram for explaining three driving modes that can be taken by an individual specifying signal.

DESCRIPTION OF EMBODIMENTS

Hereinafter, modes for carrying out the present disclosure will be described with reference to the drawings. In each drawing, the dimensions and scales of each section are properly different from actual ones. The embodiment described below is a preferable specific example of the present disclosure and includes various technically preferable restrictions. However, the scope of the present disclosure is not limited to these embodiments unless any description is given limiting the present disclosure in the following description.

1. First Embodiment

In the first embodiment, a liquid discharge apparatus will be described by illustrating an ink jet printer 1 that discharges ink as ink droplets and forms an image on recording paper PP. The ink jet printer 1 is an example of a "liquid discharge apparatus". The ink is an example of "liquid". The ink droplets are an example of a "liquid droplet". The recording paper PP is an example of a "medium".

1-1. Outline of Ink Jet Printer 1

Figure 1:
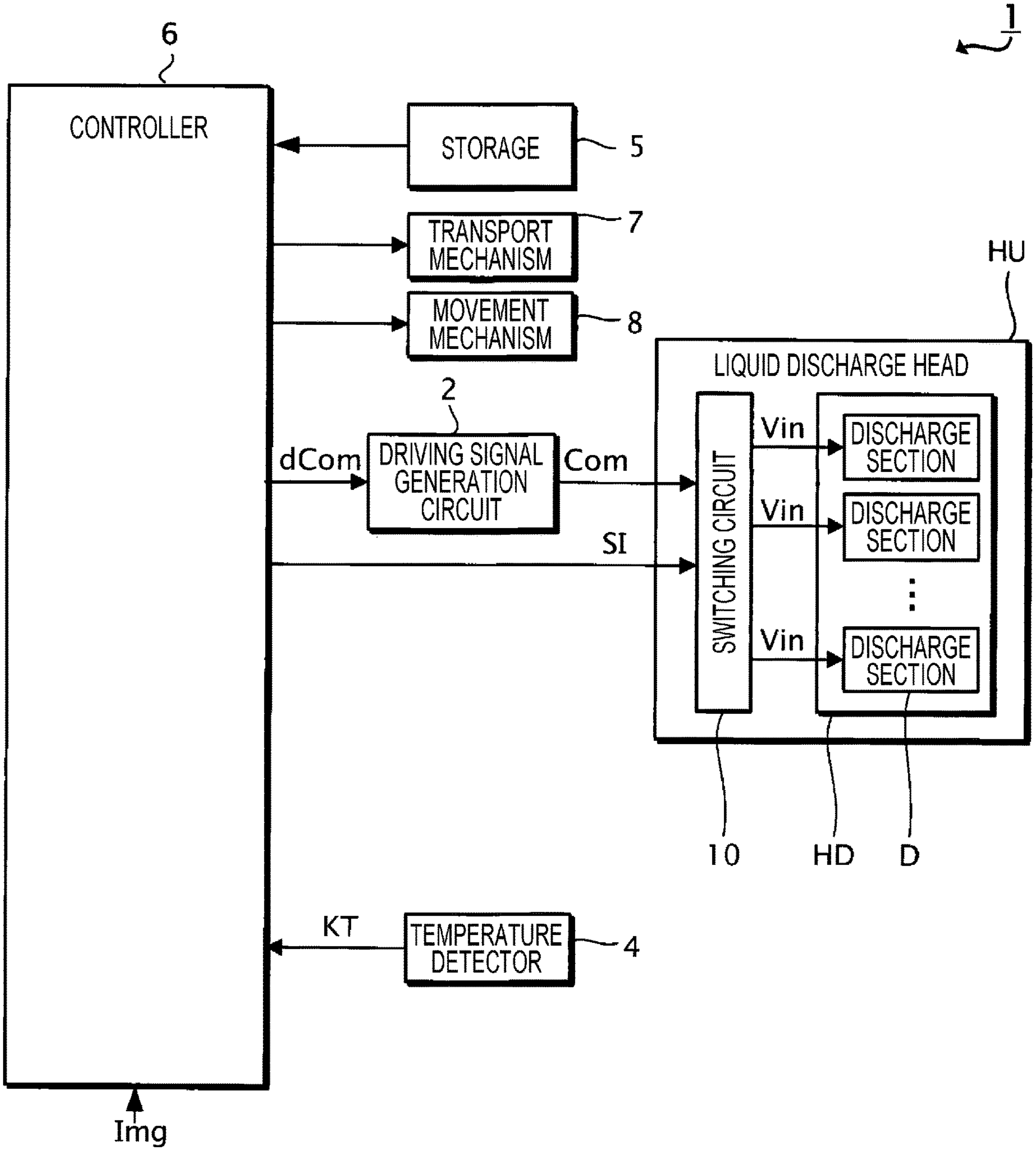
FIG. 1 is a functional block diagram illustrating an example configuration of an ink jet printer of an embodiment.
Figure 2:
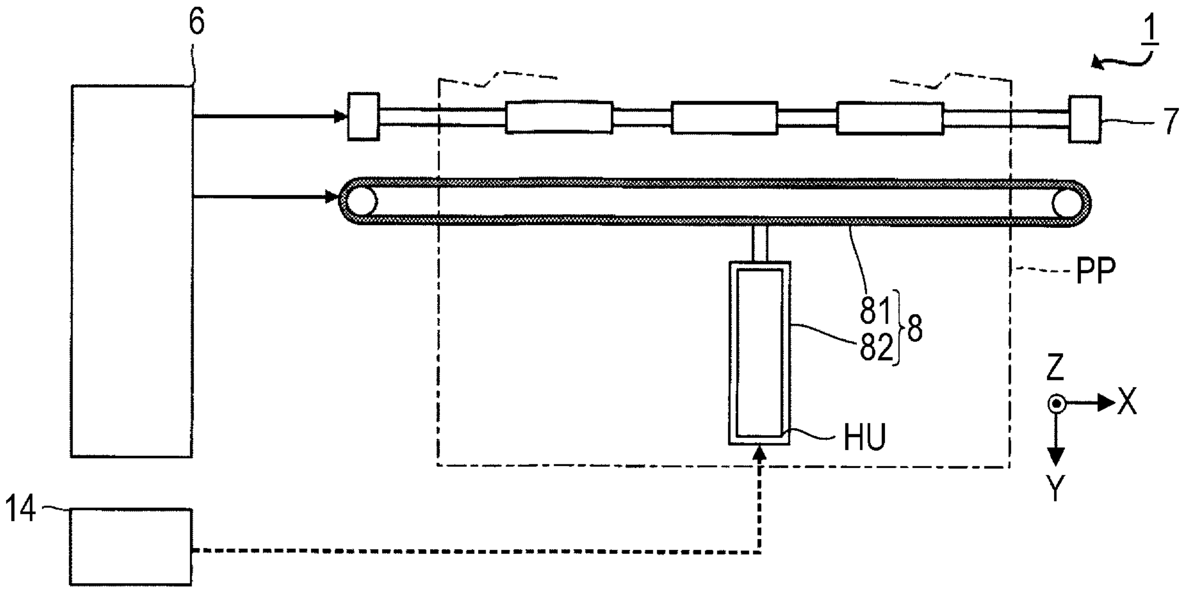
FIG. 2 is a schematic diagram illustrating the ink jet printer.

With reference to FIGS. 1 and 2, the configuration of the ink jet printer 1 in the first embodiment will be described. FIG. 1 is a functional block diagram illustrating an example configuration of the ink jet printer 1 of the first embodiment. FIG. 2 is a schematic diagram illustrating the ink jet printer 1.

The ink jet printer 1 is supplied from a host computer, such as a personal computer or a digital camera, with printing data Img representing an image to be formed by the ink jet printer 1 and information representing the number of copies of the image to be formed by the ink jet printer 1. The ink jet printer 1 executes print processing to form on the recording paper PP, an image represented by the printing data Img supplied from the host computer.

As illustrated in FIG. 1, the ink jet printer 1 includes: a liquid discharge head HU, a controller 6, a driving signal generation circuit 2, a storage 5, a transport mechanism 7, a movement mechanism 8, and a temperature detector 4. The liquid discharge head HU includes discharge sections D, which discharge ink droplets. The controller 6 controls the operation of each portion of the ink jet printer 1. The driving signal generation circuit 2 generates a driving signal Com to drive the discharge sections D. The storage 5 stores a control program of the ink jet printer 1 and the other information. The transport mechanism 7 transports the recording paper PP. The movement mechanism 8 moves the liquid discharge head HU. The temperature detector 4 detects temperature. The driving signal generation circuit 2 is an example of a "driving signal generator".

In the first embodiment, the liquid discharge head HU includes a recording head HD including M number of discharge sections D and a switching circuit 10. M is an integer not less than 1 in the first embodiment.

Hereinafter, the M number of discharge sections D included in the recording head HD are sometimes sequentially referred to as first, second, . . . , and M-th discharge sections D in order to individually identify the discharge sections D. The m-th discharge section D is sometimes referred to as a discharge section D[m]. The variable m is an integer not less than 1 and not greater than M. The constituent element, signal, or the like of the ink jet printer 1 corresponding to the discharge section D[m] is sometimes represented by a symbol indicating the same constituent element, signal, or the like together with a suffix [m] indicating that it corresponds to the discharge section D[m].

The first embodiment assumes that the ink jet printer 1 is a serial printer. Specifically, the ink jet printer 1 executes print processing by discharging ink droplets from the discharge sections D while moving the liquid discharge head HU in a main scanning direction and transporting the recording paper PP in a sub-scanning direction as illustrated in FIG. 2. In the first embodiment, as illustrated in FIG. 2, the main scanning direction includes a +X direction and a −X direction, that is opposite to the +X direction, and the sub-scanning direction is a +Y direction. Hereinafter, the +X direction and −X direction are collectively referred to as "directions along the X axis", and the +Y direction and a −Y direction, that is opposite to the +Y direction, are collectively referred to as "directions along the Y axis". Furthermore, the direction that is vertical to the directions along the X-axis and the directions along the Y-axis and is the direction in which ink is discharged is referred to as a −Z direction. The −Z direction and a +Z direction, that is opposite to the −Z direction, are collectively referred to as "directions along the Z-axis".

Figure 3:
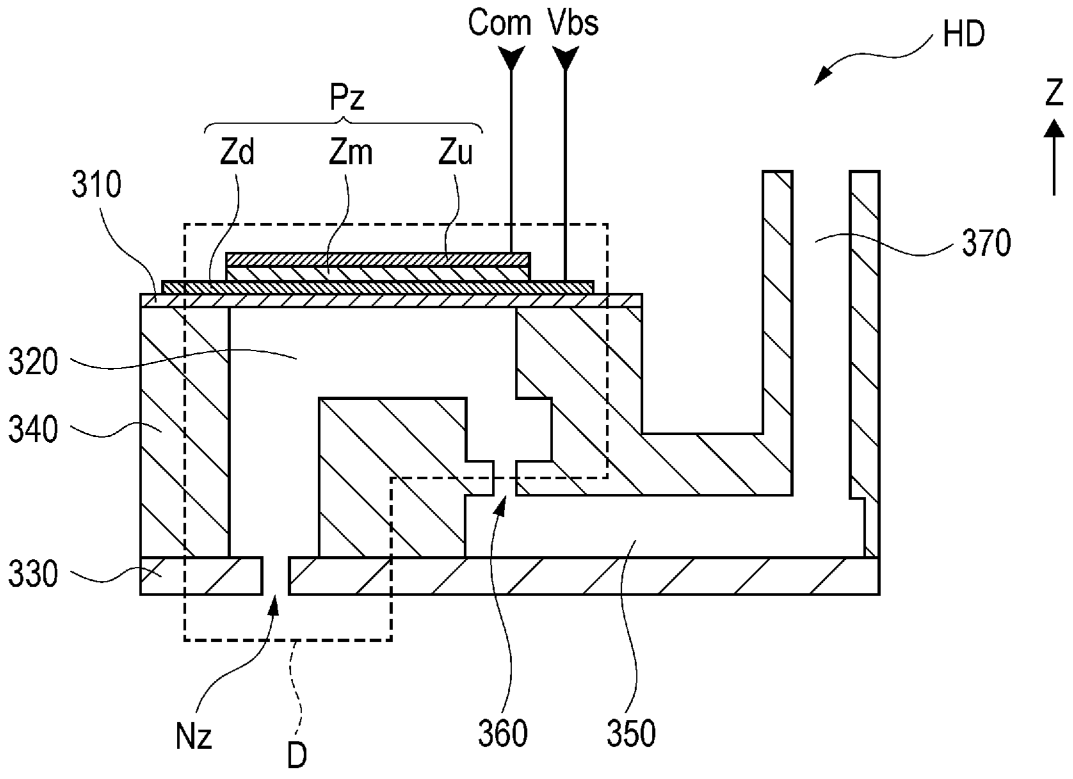
FIG. 3 is a schematic cross-sectional view of a part of a recording head, which is cut so as to include a discharge section.

With reference to FIG. 3, the recording head HD and the discharge section D, which is included in the recording head HD, will be described.

FIG. 3 is a schematic cross-sectional view of a part of the recording head HD, obtained by cutting the recording head HD so as to include the discharge section D. As illustrated in FIG. 3, the discharge section D includes a nozzle Nz, a pressure chamber 320, a piezo-element PZ, and a vibrating plate 310. The nozzle Nz discharges ink droplets in the −Z direction. The pressure chamber 320 communicates with the nozzle Nz. The piezo-element PZ effects a change in the pressure of ink within the pressure chamber 320 according to the driving signal Com. The piezo-element PZ is an example of the "driving element".

"The piezo-element PZ effects a change in the pressure of ink within the pressure chamber 320 according to the driving signal Com" means that the piezo-element PZ alters the pressure of ink within the pressure chamber 320 by being supplied with a signal including a part or all of the driving signal Com. Hereinafter, the signal actually supplied to the piezo-element PZ in the driving signal Com is sometimes referred to as a supply driving signal Vin.

The pressure chamber 320 is a space defined by a cavity plate 340, a nozzle plate 330, in which the nozzle Nz is formed, and the vibrating plate 310. The pressure chamber 320 communicates with a reservoir 350 through an ink supply port 360. The reservoir 350 communicates with a liquid container 14 corresponding to the discharge section D, through an ink inlet 370.

In the first embodiment, the piezo-element PZ is unimorph type as illustrated in FIG. 3. The piezo-element PZ is not limited to the unimorph type and can be bimorph, laminate, or the like.

The piezo-element PZ includes an upper electrode Zu, a lower electrode Zd, and a piezoelectric body Zm, which is provided between the upper electrode Zu and the lower electrode Zd. The piezo-element PZ is a passive element deforming in response to a change in potential of the supply driving signal Vin. When voltage is applied across the upper electrode Zu and the lower electrode Zd by electrically coupling the lower electrode Zd to a power supply line LHb set to a constant potential Vbs and supplying the upper electrode Zu with the supply driving signal Vin, the piezo-element PZ is displaced in the +Z or −Z direction depending on the applied voltage. Such a displacement results in vibration of the piezo-element PZ.

The vibrating plate 310 is provided over an opening in the upper surface of the cavity plate 340. The vibrating plate 310 is bonded to the lower electrode Zd. Therefore, as the piezo-element PZ is driven by the driving signal Com and vibrates, the vibrating plate 310 also vibrates. Due to the vibration of the vibrating plate 310, the volume of the pressure chamber 320 changes, and ink having filled the pressure chamber 320 is discharged through the nozzle Nz. When the amount of ink within the pressure chamber 320 decreases due to the discharge of ink, ink is supplied to the pressure chamber 320 from the reservoir 350.

The description returns to FIGS. 1 and 2. The switching circuit 10 switches whether to supply to each discharge section D, the driving signal Com outputted from the driving signal generation circuit 2.

The transport mechanism 7 transports the recording paper PP in the +Y direction. Specifically, the transport mechanism 7 includes a not-illustrated transport roller whose rotation axis is parallel to the X-axis and a not-illustrated motor rotating the transport roller under control of the controller 6.

The movement mechanism 8 reciprocates the liquid discharge head HU along the X axis under control of the controller 6. As illustrated in FIG. 2, the movement mechanism 8 includes a substantially box-shaped carrier 82, which accommodates the liquid discharge head HU, and an endless belt 81, to which the carrier 82 is fixed.

The storage 5 is composed of a volatile memory, such as a RAM, and a non-volatile memory, such as a ROM, an EEPROM, or a PROM. The storage 5 stores various information including the printing data Img supplied from the host computer and a control program of the ink jet printer 1. RAM stands for "random access memory". ROM stands for "read-only memory". EEPROM stands for "electrically erasable programmable read-only memory". PROM stands for "programmable ROM".

The controller 6 includes a CPU. CPU stands for "central processing unit". The controller 6 may include a programable logic device, such as a FPGA, instead of the CPU. FPGA stands for "field programmable gate array".

The CPU included in the controller 6 operates according to a control program stored in the storage 5, and the ink jet printer 1 thereby executes print processing.

The temperature detector 4 is a temperature sensor detecting temperature. The temperature detector 4 generates temperature information KT, which represents the detected temperature, and outputs the temperature information KT to the controller 6. In the first embodiment, the temperature detector 4 is assumed to be implemented in an electronic circuit on a substrate where the controller 6 is provided. However, the temperature detector 4 is not limited to such a configuration. The temperature detector 4 is preferably provided so as to accurately detect the temperature of ink having filled the discharge section D. For example, the temperature detector 4 therefore may be implemented in an electronic circuit on a substrate within the liquid discharge head HU.

The controller 6 generates a printing signal SI for controlling the liquid discharge head HU, a waveform specifying signal dCom for controlling the driving signal generation circuit 2, a signal for controlling the transport mechanism 7, and a signal for controlling the movement mechanism 8.

Herein, the waveform specifying signal dCom is a digital signal defining the waveform of the driving signal Com. The driving signal Com is an analog signal for driving the discharge section D. The driving signal generation circuit 2 includes a DA conversion circuit and generates the driving signal Com having a waveform defined by the waveform specifying signal dCom.

The printing signal SI is a digital signal for specifying the operation type of the discharge section D. Specifically, the printing signal SI specifies whether to supply the driving signal Com to the discharge section D to specify whether to discharge ink from the discharge section D when the discharge section D is driven.

1-2. Configuration of Liquid Discharge Head HU

Hereinafter, the configuration of the liquid discharge head HU will be described with reference to FIG. 4.

Figure 4:
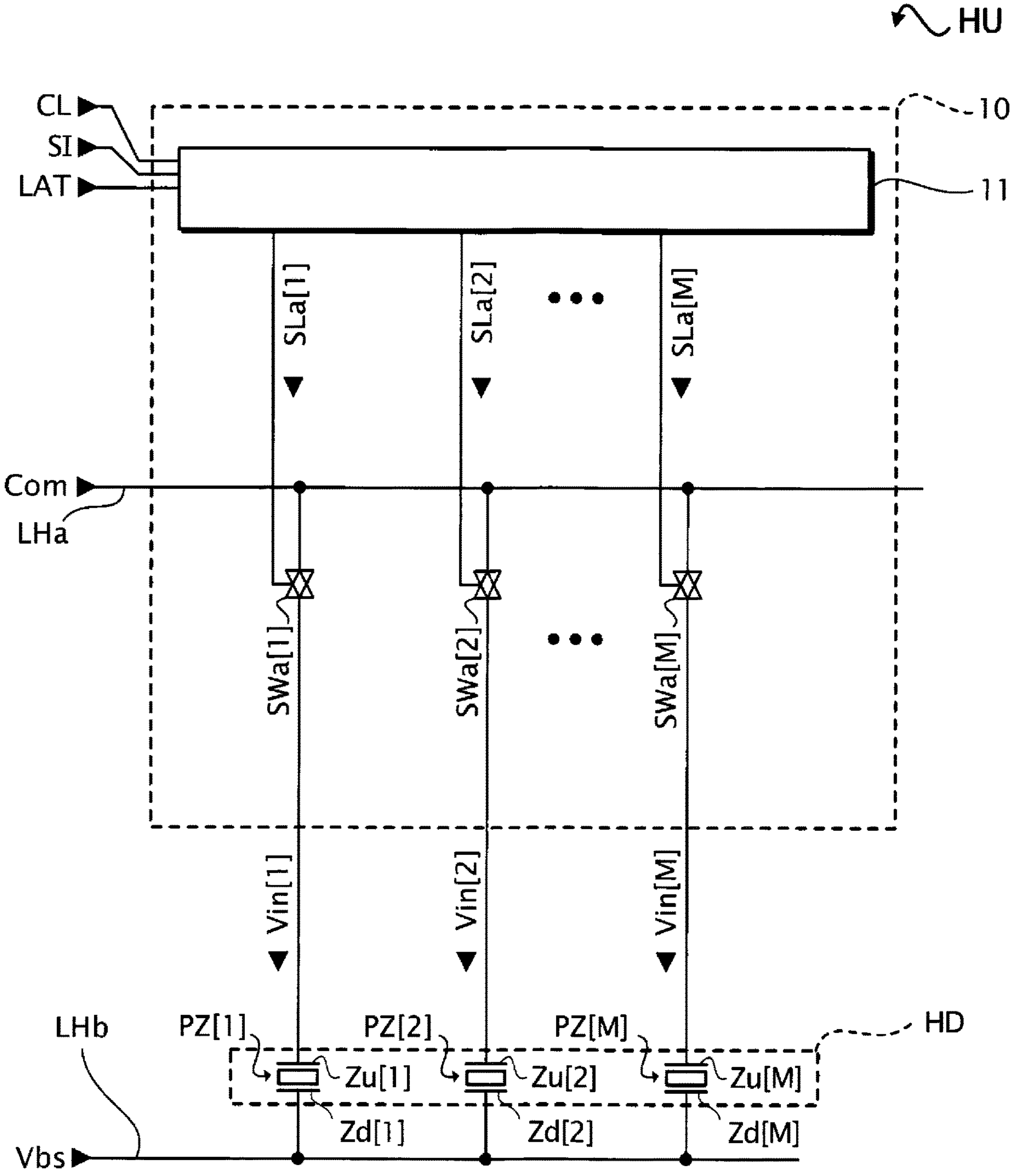
FIG. 4 is a block diagram illustrating an example configuration of a liquid discharge head.

FIG. 4 is a block diagram illustrating an example configuration of the liquid discharge head HU. As described above, the liquid discharge head HU includes the recording head HD and the switching circuit 10. The liquid discharge head HU includes an internal line LHa, which is supplied with the driving signal Com from the driving signal generation circuit 2.

As illustrated in FIG. 4, the switching circuit 10 includes switches SWa[1] to SWa[M] as M number of switches SWa and a connection status specifying circuit 11, which specifies the connection status of each switch. Each switch can be a transmission gate, for example.

According to the connection status specifying signal SLa[m], the switch SWa[m] switches between conduction and non-conduction of the internal line LHa to the upper electrode Zu[m] of the piezo-element PZ[m] included in the discharge section D[m]. Herein, m is 1 to M. For example, the switch SWa[m] is turned on when the connection status specifying signal SLa[m] is high and is turned off when the connection status specifying signal SLa[m] is low. When the switch SWa[m] is on, the supply driving signal Vin[m] is supplied to the piezo-element PZ[m].

1-3. Driving Signal Com

In order to improve the discharge performance including one or both of the discharge amount and discharge speed of ink discharged from the nozzle Nz, the driving signal Com including plural discharge pulses PL may be generated based on a natural vibration period Tc of the pressure chamber 320. Each discharge pulse PL is a pulse whose potential changes to effects a change in the pressure of ink within the pressure chamber 320 such that ink droplets can be discharged from the nozzle Nz. Vibration remaining in the discharge section D after the discharge section D is driven, that is, residual vibration, is synchronized with the natural vibration period Tc. Therefore, by using residual vibration due to the preceding discharge pulse PL, the discharge speed of ink discharged by the following discharge pulse PL is increased based on the natural vibration period Tc. This allows an ink droplet discharged by the preceding discharge pulse PL and an ink droplet discharged by the following discharge pulse PL to be combined before landing on the recording paper PP. The combining of two discharged ink droplets can reduce unevenness of print density, or so-called wood grain defects, due to air flows generated by transport of the recording paper PP, discharge of ink droplets, or the like.

However, the respective natural vibration periods Tc of the plural discharge sections D within the liquid discharge head HU have varying values due to manufacturing errors or the like. When the driving signal Com including plural discharge pulses PL generated based on a reference natural vibration period Tc is supplied to the piezo-element PZ, the phase difference between the reference natural vibration period Tc and the actual natural vibration period Tc of each discharge section D sometimes deteriorates the discharge performance and thereby degrades the quality of an image formed on the recording paper PP. Furthermore, as the cause for deteriorating the discharge performance, the inventors have experimentally revealed that an increase in ink temperature could cause tail deterioration of ink droplets. The tail deterioration of ink droplets includes an increase in tail length, an increase in tail diameter, and the like. The tail deterioration of ink droplets produces, for example, mist of fine droplets due to droplet tails, or so-called ink mist. Ink mist adhering around the nozzle Nz can deteriorate the discharge performance and cause discharge failure. The deteriorated discharge performance and the discharge failure can degrade the quality of an image formed on the recording paper PP.

The cause for the tail deterioration due to increased ink temperature will be described. Generally, when the ink temperature increases, the ink viscosity decreases, and when the ink viscosity decreases, the attenuation of residual vibration decreases. In other words, when the ink viscosity decreases, residual vibration becomes more resistant to attenuation. When residual vibration due to a certain discharge pulse PL remains more than expected until the start of the following discharge pulse PL, the tail of the ink droplet by the following discharge pulse PL increases in length. More specifically, when residual vibration due to a certain discharge pulse PL remains more than expected until the start of the following discharge pulse PL and the phase of the residual vibration and the phase of pressure fluctuations caused by the following discharge pulse PL are in resonance with each other, the difference between the speed of the end in the −Z direction, of the ink droplet discharged by the following discharge pulse PL and the speed of the end of the same ink droplet in the +Z direction is increased. The increased difference is thought to cause the tail deterioration.

When residual vibration due to a certain discharge pulse PL remains more than expected until the start of the next discharge pulse PL and the phase of residual vibration and the phase of pressure fluctuations caused by the following discharge pulse PL are not in resonance, the discharge performance of the following discharge pulse PL sometimes can be deteriorated. In this case, an ink droplet discharged by a certain discharge pulse PL and an ink droplet discharged by the following discharge pulse PL sometimes fail to combine before landing on the recording paper PP. When discharged ink droplets fail to combine, occurrence of wood grain defects degrades the quality of an image formed on the recording paper PP.

In the first embodiment, therefore, the driving signal Com is altered based on the temperature detected by the temperature detector 4. Specifically, in the first embodiment, the driving signal Com sometimes has a first driving waveform PX that is to be supplied to the piezo-element PZ when the temperature detected by the temperature detector 4 is normal temperature. More specifically, when the temperature detected by the temperature detector 4 is normal temperature, the driving signal Com includes the first driving waveform PX. The first driving waveform PX includes within one cycle, three discharge pulses PLX arranged chronologically and two connection components SCX each connecting two adjacent discharge pulses PLX among the three discharge pulses PLX. Each of the two connection components SCX is a component maintained at a constant potential for a time period longer than or equal to 0.6 times the natural vibration period Tc. The normal temperature is, for example, usual temperature of ink within the discharge sections D. The normal temperature is, for example, 22 degrees Celsius. The normal temperature is an example of a "first temperature".

The driving signal Com can include a second driving waveform PY that is to be supplied to the piezo-element PZ when the temperature detected by the temperature detector 4 is high temperature that is higher than the normal temperature. Specifically, when the temperature detected by the temperature detector 4 is the high temperature, the driving signal Com includes the second driving waveform PY. The second driving waveform PY includes within one cycle, three discharge pulses PLY arranged chronologically and two connection components SCY each connecting two adjacent discharge pulses PLY among the three discharge pulses PLY. In the following description, the first driving waveform PX and the second driving waveform PY are sometimes collectively referred to as driving waveforms without being distinguished. The high temperature is, for example, 35 degrees Celsius. The high temperature is an example of a "second temperature".

In the following description, the discharge pulses PL collectively refer to the discharge pulses PLX and PLY. The connection components SCX and SCY are sometimes collectively referred to as connection components SC. The "3" as the number of discharge pulses PLX or PLY is an example of "N not less than 3". In the example illustrated in the first embodiment, N is 3. However, the numbers of discharge pulses PLX and PLY are not limited to 3 and may be 4 or more. The three discharge pulses PLX are an example of "N number of first discharge pulses". The two connection components SCX are an example of "N−1 number of first connection components". The three discharge pulses PLY are an example of "N number of second discharge pulses". The two connection components SCY are an example of "N−1 number of second connection components".

1-4. Operation of Liquid Discharge Head HU

Hereinafter, the operation of the liquid discharge head HU will be described with reference to FIGS. 5 and 6.

In the first embodiment, the operation period of the ink jet printer 1 includes one or plural recording periods Tu. The ink jet printer 1 according to the first embodiment is assumed to execute driving of each discharge section D in the print processing in each recording period Tu. In the following description, the operation period of the ink jet printer 1 includes I number of recording periods Tu. I is an integer not less than one. The i-th recording period Tu is sometimes referred to as a recording period Tu[i] where i is an integer from 1 to I.

In general, the ink jet printer 1 forms an image represented by the printing data Img by repeatedly executing the print processing in plural consecutive or non-consecutive recording periods Tu to cause the discharge sections D to discharge ink droplets.

Figure 5:
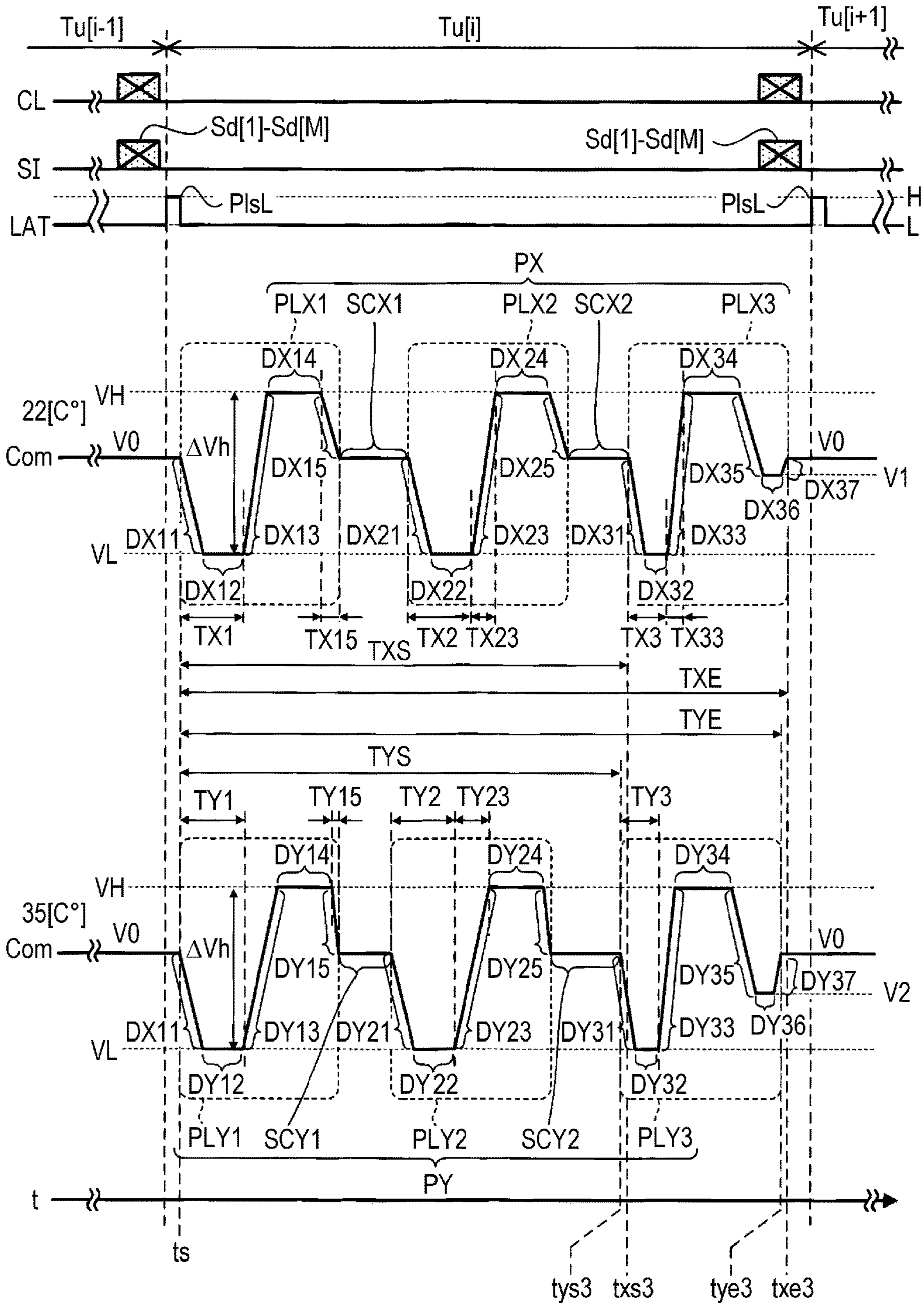
FIG. 5 is a timing chart diagram for explaining the operation of the ink jet printer in a recording period.

FIG. 5 is a timing chart for explaining the operation of the ink jet printer 1 in the recording period Tu[i].

As illustrated in FIG. 5, the controller 6 outputs a latch signal LAT including pulses PlsL. The controller 6 defines the recording period Tu[i] as a time period from the rising edge of a pulse PlsL to the rising edge of the subsequent pulse PlsL. Each recording period Tu has a length of about 85 [μ], for example. [μ] represents microsecond.

As illustrated in FIG. 5, the driving signal Com includes the first driving waveform PX when the temperature detected by the temperature detector 4 is the normal temperature and includes the second driving waveform PY when the temperature detected by the temperature detector 4 is the high temperature. [° C.] in FIG. 5 is the unit of Celsius temperature.

The first driving waveform PX includes as the three discharge pulses PLX, a discharge pulse PLX1, a discharge pulse PLX2, and a discharge pulse PLX3. The first driving waveform PX further includes as the two connection components SCX, a connection component SCX1 connecting the discharge pulse PLX1 and the discharge pulse PLX2 and a connection component SCX2 connecting the discharge pulse PLX2 and the discharge pulse PLX3.

In a similar manner, the second driving waveform PY includes as the three discharge pulses PLY, a discharge pulse PLY1, a discharge pulse PLY2, and a discharge pulse PLY3. The second driving waveform PY further includes as the two connection components SCY, a connection component SCY1 connecting the discharge pulse PLY1 and the discharge pulse PLY2 and a connection component SCY2 connecting the discharge pulse PLY2 and the discharge pulse PLY3.

In the first embodiment, the discharge pulses PLX1 and PLX2 have the same shape. However, the discharge pulses PLX1 and PLX2 may have different shapes. In a similar manner, the discharge pulses PLY1 and PLY2 have the same shape. However, the discharge pulses PLY1 and PLY2 may have different shapes.

The highest potential VH of each of the three discharge pulses PLX is substantially the same as the highest potential VH of each of the three discharge pulses PLY. The lowest potential VL of each of the three discharge pulses PLX is substantially the same as the lowest potential VL of each of the three discharge pulses PLY. Therefore, a potential difference ΔVh between the highest and lowest potentials of each of the three discharge pulses PLX is also substantially the same as a potential difference ΔVh of each of the three discharge pulses PLY. "Being substantially the same" includes "being exactly the same" as well as "being considered the same by taking the manufacturing errors into account".

The discharge pulse PLX1 includes an expansion element DX11, an expansion potential maintaining element DX12, a discharge element DX13, a contraction potential maintaining element DX14, and a vibration control element DX15. In a similar manner to the discharge pulse PLX1, the discharge pulse PLX2 includes an expansion element DX21, an expansion potential maintaining element DX22, a discharge element DX23, a contraction potential maintaining element DX24, and a vibration control element DX25. The discharge pulse PLX3 includes an expansion element DX31, an expansion potential maintaining element DX32, a discharge element DX33, a contraction potential maintaining element DX34, a vibration control element DX35, a vibration control potential maintaining element DX36, and a return element DX37. The discharge pulse PLY1 includes an expansion element DY11, an expansion potential maintaining element DY12, a discharge element DY13, a contraction potential maintaining element DY14, and a vibration control element DY15. In a similar manner to the discharge pulse PLY1, the discharge pulse PLY2 includes an expansion element DY21, an expansion potential maintaining element DY22, a discharge element DY23, a contraction potential maintaining element DY24, and a vibration control element DY25. The discharge pulse PLY3 includes an expansion element DY31, an expansion potential maintaining element DY32, a discharge element DY33, a contraction potential maintaining element DY34, a vibration control element DY35, a vibration control potential maintaining element DY36, and a return element DY37.

The expansion elements DX11, DX21, DX31, DY11, DY21, and DY31 are elements whose potential changes so as to expand the volume of the pressure chamber 320. To simplify the description, hereinafter, the expansion elements DX11, DX21, DX31, DY11, DY21, and DY31 are sometimes collectively referred to as expansion elements without being distinguished. As seen from FIG. 5, the potential of the expansion element decreases from an intermediate potential V0 to the lowest potential VL. The intermediate potential V0 is a potential between the lowest potential VL and the highest potential VH. For example, the intermediate potential V0 is a potential of about 60[%] where the lowest potential VL is 0[%] and the highest potential VH is 100 [%].

The expansion potential maintaining elements DX12, DX22, DX32, DY12, DY22, and DY32 are elements following the respective expansion elements and maintaining the last potential of the expansion elements. The last potential of the expansion elements is the lowest potential VL in the first embodiment. Hereinafter, to simplify the description, the expansion potential maintaining elements DX12, DX22, DX32, DY12, DY22, and DY32 are sometimes collectively referred to as expansion potential maintaining elements without being distinguished.

The discharge elements DX13, DX23, DX33, DY13, DY23, and DY33 are elements following the respective expansion potential maintaining elements and contracting the expanded volume of the pressure chamber 320 to discharge an ink droplet through the nozzle Nz. Hereinafter, to simplify the description, the discharge elements DX13, DX23, DX33, DY13, DY23, and DY33 are sometimes collectively referred to as discharge elements without being distinguished. The discharge elements increase in potential from the lowest potential VL to the highest potential VH.

The contraction potential maintaining elements DX14, DX24, DX34, DY14, DY24, and DY34 are elements following the respective discharge elements and maintaining the last potential of the discharge elements. The last potential of the discharge elements is the highest potential VH. Hereinafter, to simplify the description, the contraction potential maintaining elements DX14, DX24, DX34, DY14, DY24, and DY34 are sometimes collectively referred to as contraction potential maintaining elements without being distinguished.

The vibration control elements DX15, DX25, DX35, DY15, DY25, and DY35 are elements contracting the pressure chamber 320 so as to suppress the pressure vibration remaining in the ink within the pressure chamber 320 after the ink droplet is discharged from the nozzle Nz. Hereinafter, to simplify the description, the vibration control elements DX15, DX25, DX35, DY15, DY25, and DY35 are sometimes collectively referred to as vibration control elements without being distinguished. The vibration control elements DX15, DX25, DY15, and DY25 decrease in potential from the highest potential VH to the intermediate potential V0. The vibration control element DX35 decreases in potential from the highest potential VH to a potential V1. The vibration control element DY35 decreases in potential from the highest potential VH to a potential V2. The potential V1 and the potential V2 are potentials between the lowest potential VL and the intermediate potential V0. As seen from FIG. 5, the potential V1 is higher than the potential V2. The potentials V1 and V2 are respectively potentials of about 49.7[%] and about 35.0[%] where the lowest potential VL is 0[%] and the highest potential VH is 100[%].

The vibration control potential maintaining elements DX36 and DY36 are elements following the respective vibration control elements and maintaining the last potential of the vibration control elements. The last potential of the vibration control element DX35 is the potential V1, and the last potential of the vibration control element DY35 is the potential V2. Hereinafter, to simplify the description, the vibration control potential maintaining elements DX36 and DY36 are sometimes collectively referred to as vibration control potential maintaining elements without being distinguished.

The return elements DX37 and DY37 are elements following the respective vibration control potential maintaining elements and returning their potentials to the intermediate potential V0. Hereinafter, to simplify the description, the return elements DX37 and DY37 are sometimes collectively referred to as return elements without being distinguished. The return elements increase in potential from the last potential of the control potential maintaining elements to the intermediate potential V0.

The connection components SCX1, SCX2, SCY1, and SCY2 are components maintained at a constant potential. Hereinafter, to simplify the description, the connection components SCX1, SCX2, SCY1, and SCY2 are sometimes collectively referred to as connection components SC without being distinguished. In the first embodiment, the connection components SC are maintained at the intermediate potential V0 as the constant potential.

The duration of the connection component SCY2 is longer than the duration of the connection component SCX2. The duration of the connection component SCY1 is shorter than the duration of the connection component SCX1. The duration of the connection component SCY1 is shorter than the duration of the connection component SCY2. The connection component SCY2 is an example of a "second connection component immediately before the second discharge pulse chronologically located at the end among the N number of second discharge pulses". The connection component SCX2 is an example of a "first connection component immediately before the first discharge pulse chronologically located at the end among the N number of first discharge pulses". The connection component SCY1 is an example of a "second connection component immediately before the second discharge pulse that comes before the second discharge pulse chronologically located at the end among the N number of second discharge pulses". The connection component SCX1 is an example of a "first connection component immediately before the first discharge pulse that comes before the first discharge pulse chronologically located at the end among the N number of first discharge pulses".

Specifically, the durations of the connection components SCX1 and SCX2 are longer than or equal to 0.6 times the natural vibration period Tc. Furthermore, the durations of the connection components SCX1 and SCX2 are, for example, shorter than or equal to 1.1 times the natural vibration period Tc. The duration of the connection component SCY1 is longer than or equal to 0.5 times the natural vibration period Tc and is shorter than or equal to 0.8 times the natural vibration period Tc. The duration of the connection component SCY2 is longer than or equal to 0.8 times the natural vibration period Tc and is shorter than or equal to 1.1 times the natural vibration period Tc.

As illustrated in FIG. 5, a period TYE is shorter than a period TXE. The period TYE is a time period from time ts to time tye3. The period TXE is a time period from the time ts to time txe3. The time ts is the start time of the discharge pulses PLX1 and PLY1. The time tye3 is the end time of the discharge pulse PLY3. The time txe3 is the end time of the discharge pulse PLX3. The time ts is an example of a "start time of a second discharge pulse chronologically located at the top" and an example of a "start time of a first discharge pulse chronologically located at the top". The time tye3 is an example of an "end time of a second discharge pulse chronologically located at the end". The time txe3 is an example of an "end time of a first discharge pulse chronologically located at the end".

As illustrated in FIG. 5, a period TYS is shorter than a period TXS. The period TYS is a time period from the time ts to time tys3. The period TXS is a time period from the time ts to time txs3. The time tys3 is the start time of the discharge pulse PLY3. The time txs3 is the start time of the discharge pulse PLX3. The time tys3 is an example of a "start time of a second discharge pulse chronologically located at the end". The time txs3 is an example of a "start time of a first discharge pulse chronologically located at the end".

The absolute value of the potential change per unit time, of the vibration control element DY15 is greater than that of the vibration control element DX15. In other words, the potential of the vibration control element DY15 changes more rapidly than that of the vibration control element DX15. The unit time can be any period of time, and for example, is 1 sec. The absolute value of the potential change per unit time, of the vibration control element is the absolute value of the potential change of the vibration control element divided by the duration of the vibration control element. That is, the shorter the duration of the vibration control element, the greater the absolute value of the potential change per unit time, of the vibration control element. In the first embodiment, the potential changes of the vibration control elements DY15 and DX15 are both from the highest potential VH to the intermediate potential V0, that is, are of substantially the same magnitude. In the first embodiment, therefore, the absolute value of the potential change per unit time, of the vibration control element DY15 being greater than that of the vibration control element DX15 means that a duration TY15 of the vibration control element DY15 is shorter than a duration TX15 of the vibration control element DX15 as illustrated in FIG. 5. Furthermore, the discharge pulses PLX1 and PLX2 have the same shape, and the discharge pulses PLY1 and PLY2 have the same shape. Therefore, the absolute value of the potential change per unit time, of the vibration control element DY25 is greater than that of the vibration control element DX25. In a similar manner, the absolute value of the potential change per unit time, of the vibration control element DY35 is greater than that of the vibration control element DX35.

Thus, the absolute value of the potential change per unit time, of the vibration control element of the n1-th discharge pulse PLY is greater than that of the vibration control element of the n1-th discharge pulse PLX. Herein, n1 is an integer variable not less than 1 and not greater than 3 as the number N of discharge pulses PL.

The absolute value of the potential change per unit time, of the discharge element DY23 is smaller than that of the discharge element DX23. In other words, the potential of the discharge element DY23 changes more slowly than the potential of the discharge element DX23. The absolute value of the potential change per unit time, of the discharge element is the absolute value of the potential change of the discharge element divided by the duration of the discharge element. That is, the shorter the duration of the discharge element, the greater the absolute value of the potential change per unit time, of the discharge element. In the first embodiment, the potential changes of the discharge elements DY23 and DX23 are both from the lowest potential VL to the highest potential VH, that is, are of substantially the same magnitude. In the first embodiment, therefore, the absolute value of the potential change per unit time, of the discharge element DY23 being smaller than that of the discharge element DX23 means that a duration TY23 of the discharge element DY23 is longer than a duration TX23 of the discharge element DX23 as illustrated in FIG. 5. Furthermore, the discharge pulses PLX1 and PLX2 have the same shape, and the discharge pulses PLY1 and PLY2 have the same shape. Therefore, the absolute value of the potential change per unit time, of the discharge element DY13 is smaller than that of the discharge element DX13.

Thus, the absolute value of the potential change per unit time, of the discharge element of the n2-th discharge pulse PLY is smaller than that of the charge element of the n2-th discharge pulse PLX. Herein, n2 is an integer variable not smaller than 1 and not greater than 2 as the number N of discharge pulses PL minus 1.

The absolute value of the difference between the period TX3 and 0.5 times the natural vibration period Tc is smaller than the absolute value of the difference between the period TX2 and 0.5 times the natural vibration period Tc. The period TX3 is the time period from the start of the expansion element DX31 to the start of the discharge element DX33. The period TX2 is the time period from the start of the expansion element DX21 to the start of the discharge element DX23. The discharge pulses PLX1 and PLX2 have the same shape. Therefore, the absolute value of the difference between the period TX3 and 0.5 times the natural vibration period Tc is smaller than the absolute value of the difference between the period TX1 and 0.5 times the natural vibration period Tc. The period TX1 is the time period from the start of the expansion element DX11 to the start of the discharge element DX13.

Thus, the absolute value of the difference between 0.5 times the natural vibration period Tc and the time period from the start of the expansion element to the start of the discharge element in the N-th discharge pulse PLX (N is the number of discharge pulses PLX), that is, the discharge pulse PLX chronologically located at the end is smaller than the absolute value of the difference between 0.5 times the natural vibration period Tc and the time period from the start of the expansion element to the start of the discharge element in the discharge pulses PLX chronologically located at other than the end.

The absolute value of the difference between a period TY3 and 0.5 times the natural vibration period Tc is smaller than the absolute value of the difference between a period TY2 and 0.5 times the natural vibration period Tc and is smaller than the absolute value of the difference between a period TY1 and 0.5 times the natural vibration period Tc. The period TY3 is the time period from the start of the expansion element DY31 to the start of the discharge element DY33. The period TY2 is the time period from the start of the expansion element DY21 to the start of the discharge element DY23. The period TY1 is the time period from the start of the expansion element DY11 to the start of the discharge element DY13.

The absolute value of the potential change per unit time, of the discharge element DX33 is greater than that of the discharge element DX23. In other words, the potential of the discharge element DX33 changes more rapidly than that of the discharge element DX23. In the first embodiment, the potential changes of the discharge elements DX33 and DX23 are both from the lowest potential VL to the highest potential VH, that is, are of substantially the same magnitude. In the first embodiment, therefore, the absolute value of the potential change per unit time, of the discharge element DX33 being greater than that of the discharge element DX23 means that a duration TX33 of the discharge element DX33 is shorter than the duration TX23 of the discharge element DX23 as illustrated in FIG. 5. In a similar manner, the absolute value of the potential change per unit time, of the discharge element DX33 is greater than that of the discharge element DX13.

Thus, the absolute value of the potential change per unit time, of the discharge element of the N-th discharge pulse PLX (N is the number of discharge pulses PLX), that is, the discharge pulse PLX chronologically located at the end is greater than the absolute value of the potential change per unit time, of the discharge element of the discharge pulses PLX chronologically located at other than the end.

The printing signal SI includes individual specifying signals Sd[1] to Sd[M], which specify the driving mode of the respective discharge sections D[1] to D[M] in each recording period Tu. To execute the print processing in the recording period Tu[i], as illustrated in FIG. 5, before starting the recording period Tu[i], the controller 6 supplies the printing signal SI including the individual specifying signals Sd[1] to Sd[M], to the connection status specifying circuit 11 in synchronization with a clock signal CL. In this case, for any m from 1 to M, the connection status specifying circuit 11 creates the connection status specifying signal SLa[m] based on the individual specifying signal Sd[m] in the recording period Tu[i].

For any m from 1 to M, the individual specifying signal Sd[m] according to the first embodiment is a signal specifying any one of the two modes, whether to drive the discharge section D[m], in each recording period Tu. In the first embodiment, for example, the individual specifying signal Sd[m] is a 1-bit digital signal.

For any m from 1 to M, when the individual specifying signal Sd[m] specifies to drive the discharge section D[m], the connection status specifying circuit 11 sets high the connection status specifying signal SLa[m]. When the individual specifying signal Sd[m] specifies not to drive the discharge section D[m], the connection status specifying circuit 11 sets low the connection status specifying signal SLa[m].

Figure 6:
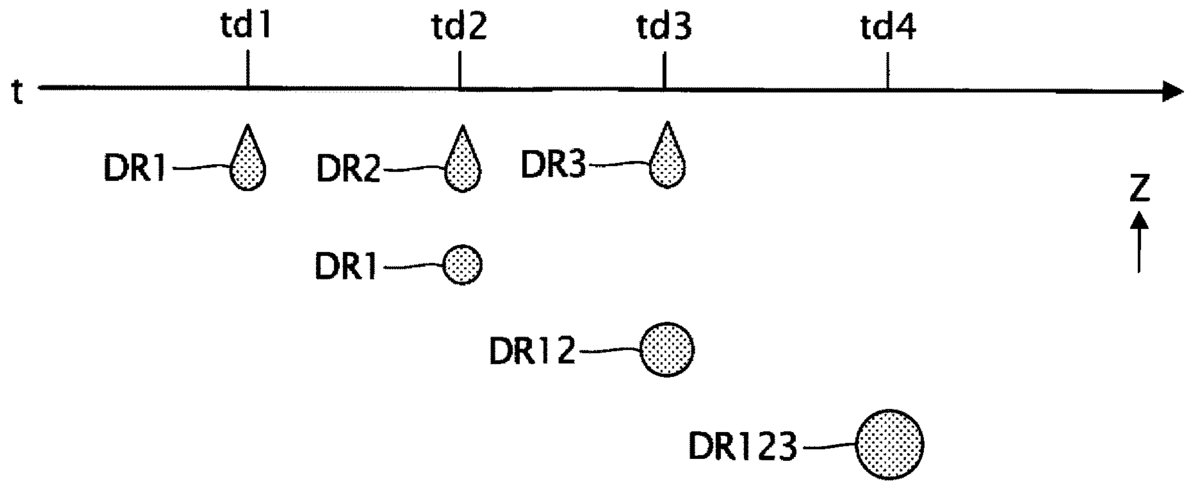
FIG. 6 is a diagram for explaining an example of the manner in which ink droplets discharged by a first driving waveform are combined.

FIG. 6 is a diagram for explaining an example of the manner in which ink droplets discharged by the first driving waveform PX are combined. Three ink droplets that are discharged from the nozzle Nz in one-to-one correspondence to the three discharge pulses PLX by the first driving waveform PX being supplied to the piezo-element PZ are combined before landing on the recording paper PP. When the second driving waveform PY is supplied to the piezo-element PZ, though not illustrated, three ink droplets in one-to-one correspondence to the three discharge pulses PLY are combined before landing on the recording paper PP.

At time td1 illustrated in FIG. 6, an ink droplet DR1 is discharged from the nozzle Nz by the discharge element DX13 and flies in the −Z direction. Next, at time td2 after the time td1, an ink droplet DR2 is discharged from the nozzle Nz by the discharge element DX23 and flies in the −Z direction. At time td3 after the time td2, an ink droplet DR3 is discharged from the nozzle Nz by the discharge element DX33 and flies in the −Z direction. Furthermore, between the time td2 and the time td3, the ink droplet DR1 and the ink droplet DR2 are combined to form a combined droplet DR12. At time td4 after the time td3, the combined droplet DR12 and the ink droplet DR3 are combined to form a combined droplet DR123.

The manner in which ink droplets are combined is not limited to that illustrated in FIG. 6. For example, the ink droplet DR2 and the ink droplet DR3 may be combined, and then the resulting combined droplet and the ink droplet DR1 may be combined. Alternatively, the ink droplet DR1, the ink droplet DR2, and the ink droplet DR3 may be combined at the same time.

Figure 7:
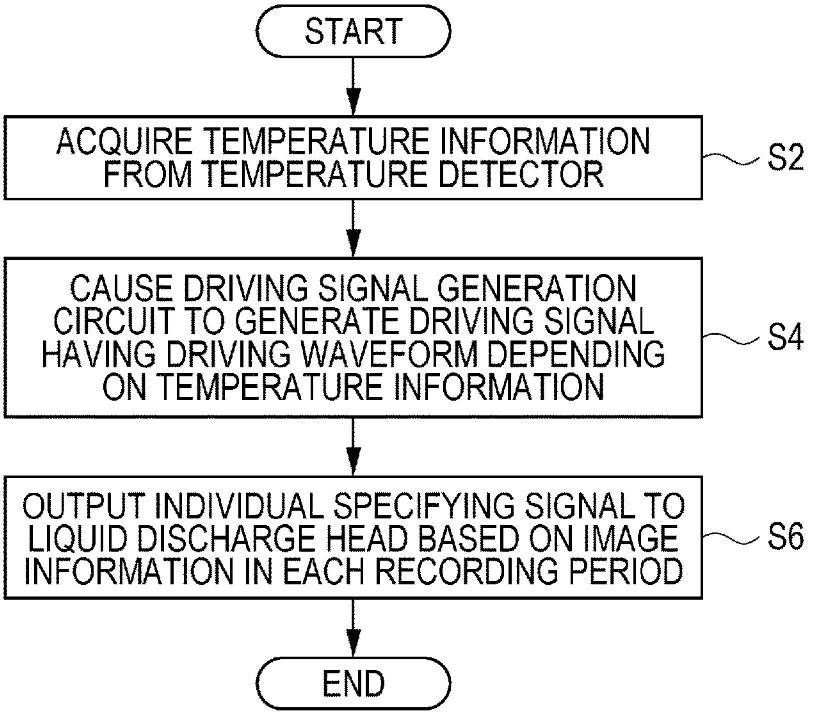
FIG. 7 is a flowchart diagram illustrating the operation of a controller.

FIG. 7 is a flowchart illustrating the operation of the controller 6. FIG. 7 illustrates a series of operations of the controller 6 for executing the print processing. When receiving the printing data Img, in step S2, the controller 6 acquires the temperature information KT from the temperature detector 4. Next, in step S4, the controller 6 causes the driving signal generation circuit 2 to generate the driving signal Com having a driving waveform depending on the temperature information KT. The specific method of step S2 will be described. For example, the storage 5 stores a waveform specifying signal management table TBL illustrated in FIG. 8.

FIG. 8 is a diagram illustrating an example of the waveform specifying signal management table TBL. The waveform specifying signal management table TBL stores the waveform specifying signal dCom specifying the driving waveform for each of plural temperatures that can be detected by the temperature detector 4. In the example of FIG. 8, a waveform specifying signal dCom-PX specifying the first driving waveform PX is stored in association with 22 degrees Celsius as an example of the normal temperature, and a waveform specifying signal dCom-PY specifying the second driving waveform PY is stored in association with 35 degrees Celsius as an example of the high temperature.

The controller 6 acquires the waveform specifying signal dCom associated with the temperature indicated by the temperature information KT with reference to the waveform specifying signal management table TBL. When the temperature indicated by the temperature information KT is not registered in the waveform specifying signal management table TBL, for example, the controller 6 acquires the waveform specifying signal dCom associated with the temperature that is the closest to the temperature indicated by the temperature information KT among the plural temperatures registered in the waveform specifying signal management table TBL. The controller 6 outputs the acquired waveform specifying signal dCom to the driving signal generation circuit 2. The driving signal generation circuit 2 then generates the driving signal Com having the driving waveform defined by the waveform specifying signal dCom.

The description returns to FIG. 7. After the processing in step S4 is completed, in step S6, the controller 6 outputs the individual specifying signals Sd[1] to Sd[M] generated based on the printing data Img to the liquid discharge head HU for one or plural recording periods Tu. In step S6, not illustrated in FIG. 7, the controller 6 outputs the clock signal CL and the latch signal LAT for one or plural recording periods Tu.

After the processing in step S6 is completed, the controller 6 terminates the series of operations illustrated in FIG. 7. The series of operations of the controller 6 is not limited to the operations illustrated in FIG. 7. For example, when there is a possibility the temperature of ink having filled the discharge section D significantly fluctuates during the print processing, the controller 6 may execute the processing in step S2 and the processing in step S4 to alter the driving signal Com each time predetermined conditions are met. The predetermined conditions are, for example, whether images are formed on a predetermined number of sheets of the recording paper PP, whether a predetermined number of recording periods Tu have elapsed, and whether the liquid discharge head HU has repeated the movement from one end to the other end along the X axis and then back to the one end for a predetermined number of times.

1-5. Examples

The following description will be given of Examples of the first embodiment, but the first embodiment is not limited to Examples below.

FIG. 9 is a diagram illustrating ink droplet shapes in Example 1, Example 2, Example 3, and Comparative Example. In Example 1, the lengths of the connection components SCX1 and SCX2 of the first driving waveform PX supplied to the piezo-element PZ when the ink temperature is 22[° C.], which is the normal temperature, are 0.9 times the natural vibration period Tc. In Example 2, the length of the connection component SCX1 of the first driving waveform PX supplied to the piezo-element PZ when the ink temperature is 22[° C.], which is the normal temperature, is 0.9 times the natural vibration period Tc, and the length of the connection component SCX2 is 0.8 times the natural vibration period Tc. In Example 3, the length of the connection component SCY1 of the second driving waveform PY supplied to the piezo-element PZ when the ink temperature is 35[° C.], which is the high temperature, is 0.7 times the natural vibration period Tc, and the length of the connection component SCY2 is 0.9 times the natural vibration period Tc. In Comparative Example, the length of the connection component SCY1 of the second driving waveform PY supplied to the piezo-element PZ when the ink temperature is 35[° C.], which is the high temperature, is 0.9 times the natural vibration period Tc, and the length of the connection component SCY2 is 0.8 times the natural vibration period Tc.

FIG. 9 illustrates four combined droplets DRa, four combined droplets DRb, four combined droplets DRc, and four combined droplets DRd. The four combined droplets DRa are schematic illustrations of four combined droplets that are formed when the temperature detected by the temperature detector 4 is 22 degrees Celsius in Example 1, in such manner that the first driving waveform PX is supplied to four piezo-elements PZ and 12 ink droplets in total, discharged from the nozzles Nz corresponding to the respective four piezo-elements PZ are combined in groups of three. As seen from the four combined droplets DRa, even when the same driving waveform is supplied to plural piezo-elements PZ, the ink droplets discharged from the nozzles Nz corresponding to the respective plural piezo-elements PZ sometimes vary in discharge performance. This is because the natural vibration periods Tc of the pressure chambers 320 have varying values due to manufacturing errors of the pressure chambers 320 or shape errors of the nozzles Nz. However, in Example 1, the lengths of the connection components SCX1 and SCX2 are 0.9 times the natural vibration period Tc, which is not less than 0.6 times. Therefore, the ink droplets discharged from the nozzles Nz corresponding to the respective plural piezo-elements PZ are substantially equal in discharge performance.

The four combined droplets DRb are schematic illustrations of four combined droplets that are formed when the temperature detected by the temperature detector 4 is 22 degrees Celsius in Example 2, in such manner that the first driving waveform PX is supplied to four piezo-elements PZ and 12 ink droplets in total, discharged from the nozzles Nz corresponding to the respective four piezo-elements PZ are combined in groups of three. In Example 2, the lengths of the connection components SCX1 and SCX2 are not less than 0.6 times the natural vibration period Tc. The ink droplets discharged from the nozzles Nz in correspondence to the respective plural piezo-elements PZ therefore are substantially equal in discharge performance without being influenced by the differences among the natural vibration periods Tc of the respective pressure chambers 320 in a similar manner to Example 1. In Example 2, furthermore, the length of the connection component SCX1 is set to 0.9 times the natural vibration period Tc, and the length of the connection component SCX2 is set to 0.8 times the natural vibration period Tc, which is shorter than the length of the connection component SCX1. The ink droplet by the discharge pulse PLX3 can thereby be discharged earlier in Example 2 than in Example 1. In Example 2, therefore, the ink droplet by the discharge pulse PLX3 can be combined with the preceding ink droplet earlier than in Example 1, so that the tail length Lb of the combined droplet DRb is shorter than the tail length La of the combined droplet DRa.

The four combined droplets DRc are schematic illustrations of four combined droplets that are formed when the temperature detected by the temperature detector 4 is 35 degrees Celsius in Example 3, in such manner that the second driving waveform PY is supplied to four piezo-elements PZ and 12 ink droplets in total, discharged from the nozzles Nz corresponding to the respective four piezo-elements PZ are combined in groups of three. In Example 3, the length of the connection component SCY1 is 0.7 times the natural vibration period Tc of the pressure chamber 320, and the length of the connection component SCY2 is 0.9 times the natural vibration period Tc of the pressure chamber 320.

The four combined droplets DRd are schematic illustrations of four combined droplets that are formed when the temperature detected by the temperature detector 4 is 35 degrees Celsius in Comparative Example, in such manner that the second driving waveform PY is supplied to four piezo-elements PZ and 12 ink droplets in total, discharged from the nozzles Nz corresponding to the respective four piezo-elements PZ are combined in groups of three. In Comparative Example, the length of the connection component SCY1 is 0.9 times the natural vibration period Tc of the pressure chamber 320, which is the same as the length of the connection component SCX1 in Example 2, and the length of the connection component SCY2 is 0.8 times the natural vibration period Tc of the pressure chamber 320, which is the same as the length of the connection component SCX2 of Example 2.

As described above, when the ink temperature increases, residual vibration becomes more resistant to attenuation. When the ink temperature is high, even when the lengths of the connection components SCY1 and SCY2 are set greater than or equal to 0.6 times the natural vibration period Tc of the pressure chamber 320, the tail length of the liquid droplet discharged by the following discharge pulse PLY can be increased under the influence of residual vibration due to the preceding discharge pulse PLY. Therefore, the length of the connection component SCY2 in Example 3 is set to 0.9 times the length of the natural vibration period Tc of the pressure chamber 320 so as to reduce the influence of the residual vibration still remaining when the discharge pulse PLY3 is supplied. Furthermore, the length of the connection component SCY1 of Example 3 is set to 0.7 times the length of the natural vibration period Tc of the pressure chamber 320. It is therefore possible to prevent the time period between the supply of the first discharge pulse PLY1 and the supply of the last discharge pulse PLY3 from increasing due to the increase in length of the connection component SCY2. This allows the droplet discharged by the preceding discharge pulse PLY and the droplet discharged by the last discharge pulse PLY to be combined earlier, thus preventing occurrence of mist. Even when the length of the connection component SCY1 is set to 0.7 times the natural vibration period Tc and the tail length of the droplet discharged by the discharge pulse PLY2 is increased under the influence of residual vibration when the discharge pulse PLY2 is supplied, combining of the ink droplet discharged by the discharge pulse PLY2 with the ink droplet discharged by the following discharge pulse PLY3 prevents occurrence of mist.

As illustrated in FIG. 9, the tail length Lb of the combined droplet DRb is shorter than the tail length La of the combined droplet DRa. Tail length Lc of the combined droplet DRc is shorter than tail length Ld of the combined droplet DRd.

Furthermore, when the ink temperature is the normal temperature, as illustrated in FIG. 9, the tail length Lb of Example 2, in which the length of the connection component SCX2 is set to 0.8 times the natural vibration period Tc, is shorter than the tail length La of Example 1, in which the length of the connection component SCX2 is set to 0.9 times the length of the natural vibration period Tc.

When the ink temperature is the high temperature, as illustrated in FIG. 9, the length of the connection component SCY1 is set to 0.7 times the natural vibration period Tc, which is shorter than the length of the connection component SCX1 of Example 2 (its ink temperature is the normal temperature), and the length of the connection component SCY2 is set to 0.9 times the natural vibration period Tc, which is longer than the connection component SCX2 of Example 2 (its ink temperature is the normal temperature). Therefore, the tail length Lc of the combined droplet DRc of Example 3 is shorter than the tail length Ld of the combined droplet DRd of Comparative Example, in which the lengths of the connection components are set equal to those of Example 2 (its ink temperature is the normal temperature).

1-6. Summary of First Embodiment

As described above, the ink jet printer 1 includes: the liquid discharge head HU, which includes the discharge section D having: the nozzle Nz discharging ink as an ink droplet; the pressure chamber 320 communicating with the nozzle Nz; and the piezo-element PZ altering the pressure of ink within the pressure chamber 320 according to the driving signal Com; the driving signal generation circuit 2 generating the driving signal Com; and the temperature detector 4 detecting temperature. When the temperature detector 4 detects the normal temperature, the driving signal Com includes the first driving waveform PX configured to be supplied to the piezo-element PZ when the temperature detector 4 detects the normal temperature. The first driving waveform PX includes within one cycle, N number of discharge pulses PLX arranged chronologically and N−1 number of connection components SCX each connecting two adjacent discharge pulses PLX among the N number of the discharge pulses PLX. Herein, N is not less than 3. Each of the N number of discharge pulses PLX is a pulse whose potential changes to alter the pressure of ink within the pressure chamber 320 such that the ink droplets can be discharged through the nozzle Nz. Each of the N−1 number of connection components SCX is a component maintained at a constant potential for a time period longer than or equal to 0.6 times the natural vibration period Tc.

In the ink jet printer 1 according to the first embodiment, the duration of each of the N−1 number of connection components SCX is set greater than or equal to 0.6 times the natural vibration period Tc for the normal temperature. This can reduce the influence of residual vibration due to the n-th discharge pulse PLX on the discharge by the (n+1)-th discharge pulse PLX. Herein, n is any integer from 1 to N−1. It is therefore possible to prevent deterioration of the discharge performance by the (n+1)-th discharge pulse PLX compared to a configuration in which the duration of each of the N−1 number of connection components SCX is shorter than 0.6 times the natural vibration period Tc. This can prevent degradation of the quality of an image formed on the recording paper PP.

When the temperature detector 4 detects the high temperature, which is higher than the normal temperature, the driving signal Com includes the second driving waveform PY configured to be supplied to the piezo-element PZ when the temperature detector 4 detects the high temperature. The second driving waveform PY includes within one cycle, the N number of discharge pulses PLY arranged chronologically and the N−1 number of connection components SCY each connecting two adjacent discharge pulses PLY among the N number of discharge pulses PLY. Each of the N−1 number of connection components SCY is a component maintained at a constant potential. The duration of the connection component SCY immediately before the discharge pulse PLY chronologically located at the end among the N number of discharge pulses PLY, that is, the duration of the (N−1)-th connection component SCY, is longer than the duration of the connection component SCX immediately before the discharge pulse PLX chronologically located at the end among the N number of discharge pulses PLX, that is, the duration of the (N−1)-th connection component SCX. The duration of the connection component SCY immediately before the discharge pulse PLY that comes before the discharge pulse PLY chronologically located at the end among the N number of discharge pulses PLY is shorter than the duration of the connection component SCX immediately before the discharge pulse PLX that comes before the discharge pulse PLX chronologically located at the end among the N number of discharge pulses PLX.

As described above, when the ink temperature increases, the attenuation of residual vibration decreases. Among discharge speeds of the N number of ink droplets discharged by the N number of discharge pulses PLY, the discharge speed of the ink droplet discharged last affects most significantly on the accuracy of the landing position of the ink droplet formed by combining of the N number of ink droplets. At the high temperature state where the ink temperature is higher than the normal temperature, the duration of the connection component SCY chronologically located at the end in the second driving waveform PY is increased. This can reduce the influence of residual vibration of the ink droplet discharged last, thus preventing the decrease in accuracy of the landing position of the ink droplet formed by combining of the N number of ink droplets. Furthermore, the tail length of the ink droplet discharged last can be shortened. On the other hand, the duration of the connection components SCY chronologically located at other than the end in the second driving waveform PY is shortened. The one cycle length of the second driving waveform PY can thereby be substantially the same as that of the first driving waveform PX. When the one cycle length of the second driving waveform PY is different from that of the first driving waveform PX, the length of the recording period Tu needs to be altered depending on the temperature. However, the length of the recording period Tu does not need to be altered depending on the temperature since the one cycle length of the second driving waveform PY is substantially the same as that of the first driving waveform PX. Therefore, since the one cycle length of the second driving waveform PY is substantially the same as that of the first driving waveform PX, the length of the recording period Tu does not need to be altered, so that the liquid discharge head HU can be easily controlled.

The time period from the start of the discharge pulse PLY chronologically located at the top among the N number of discharge pulses PLY to the end of the discharge pulse PLY chronologically located at the end, that is, the period TYE in the example of FIG. 5, is shorter than the time period from the start of the discharge pulse PLX chronologically located at the top among the N number of discharge pulses PLX to the end of the discharge pulse PLX chronologically located at the end, that is, the period TXE in the example of FIG. 5.

As described above, when the ink temperature increases, the attenuation of residual vibration decreases. When the ink temperature has increased, in two chronologically-successive recording periods Tu, the time period from the end of the discharge pulse PLY located at the end of the preceding recording period Tu to the start of the discharge pulse PLY located at the top of the subsequent recording period Tu is increased. The residual vibration due to the discharge pulses PLY of the preceding recording period Tu is thereby attenuated sufficiently, thus preventing deterioration of the discharge performance of ink droplets discharged by the discharge pulses PLY in the subsequent recording period Tu. According to the first embodiment, compared to a configuration in which the period TYE is longer than the period TXE, in two chronologically-successive recording periods Tu, it is possible to increase the time period from the discharge pulse PLY located at the end of the second driving waveform PY in the preceding recording period Tu to the discharge pulse PLY located at the top of the second driving waveform PY in the subsequent recording period Tu. This can prevent deterioration of the discharge performance of ink droplets discharged by the N number of discharge pulses PLY of the second driving waveform PY in the subsequent recording period Tu.

The time period from the start of the discharge pulse PLY chronologically located at the top among the N number of discharge pulses PLY to the start of the discharge pulse PLY chronologically located at the end, that is, the period TYS in the example of FIG. 5, is shorter than the time period from the start of the discharge pulse PLX chronologically located at the top among the N number of discharge pulses PLX to the start of the discharge pulse PLX chronologically located at the end, that is, the period TXS in the example of FIG. 5.

Since the period TYS is shorter than the period TXS, the discharge pulse PLY chronologically located at the end can be discharged earlier than in a configuration where the period TYS is longer than the period TXS. The ink droplet by the discharge pulse PLY chronologically located at the end can be easily combined with the ink droplets discharged earlier. Even when the discharge element of the discharge pulse PLY chronologically located at the end is configured to change in potential more slowly, the ink droplet by the discharge pulse PLY chronologically located at the end can be combined with ink droplets discharged earlier. This can prevent formation of mist due to the discharge of the ink droplet by the discharge pulse PLY chronologically located at the end.

The absolute value of the potential change per unit time, of the vibration control element of the n1-th discharge pulse PLY from the start of one cycle of the N number of discharge pulses PLY, is greater than that of the vibration control element of the n1-th discharge pulse PLX from the start of one cycle of the N number of discharge pulses PLX. Herein, n1 is an integer not less than 1 and not greater than N. In other words, the potential of the vibration control element of the n1-th discharge pulse PLY changes more rapidly than that of the n1-th discharge pulse PLX.

As described above, as the ink temperature increases, the attenuation of residual vibration decreases. In the first embodiment, therefore, the potential of the vibration control element of the n1-th discharge pulse PLY is configured to change more rapidly. This can increase the force to suppress pressure vibration of ink within the pressure chamber 320. According to the first embodiment, it is therefore possible to attenuate residual vibration due to the discharge pulses PLY at the high temperature, compared to a configuration in which the potential of the vibration control element of the n1-th discharge pulse PLX changes more rapidly than that of the n1-th discharge pulse PLY.

The absolute of the potential change per unit time, of the discharge element of the n2-th discharge pulse PLY from the start of one cycle of the N number of discharge pulses PLY is smaller than that of the discharge element of the n2-th discharge pulse PLX from the start of one cycle of the N number of discharge pulses PLX. Herein, n2 is an integer not less than 1 and not greater than N−1. In other words, the potential of the discharge element of the n2-th discharge pulse PLY changes more slowly than that of the n2-th discharge pulse PLX.

As the ink temperature increases, decreasing ink viscosity tends to increase the discharge speed of ink droplets. Therefore, when the potential of the discharge element of the n2-th discharge pulse PLY is configured to change more slowly, the discharge speed of the ink droplet by the n2-th discharge pulse PLY is reduced, and the ink droplet by the (n2+1)-th discharge pulse PLY easily catches up with the ink droplet by the n2-th discharge pulse PLY. The ink droplet by the (n2+1)-th discharge pulse PLY can thereby be easily combined with the ink droplet by the n2-th discharge pulse PLY. Furthermore, as described above, as the ink temperature increases, the attenuation of residual vibration decreases. Therefore, when the potential of the discharge element of the n2-th discharge pulse PLY is configured to change more slowly, the discharge speed of the ink droplet by the n2-th discharge pulse PLY is reduced, and its residual vibration is reduced. According to the first embodiment, compared to a configuration in which the potential of the discharge element of the n2-th discharge pulse PLY changes more rapidly than that of the discharge element of the n2-th discharge pulse PLX, it is possible to facilitate combining of the ink droplet by the (n2+1)-th discharge pulse PLY and the ink droplet by the n2-th discharge pulse PLY and reduce the residual vibration due to the n2-th discharge pulse PLY.

The liquid discharge head HU discharges ink droplets toward the recording paper PP. The N number of ink droplets that are discharged from the nozzle Nz in one-to-one correspondence to the N number of discharge pulses PLX by the first driving waveform PX being supplied to the piezo-element PZ are combined before landing on the recording paper PP.

Since the N number of ink droplets are combined before landing on the recording paper PP, compared to a configuration in which the N number of ink droplets are not combined, it is possible to reduce occurrence of wood grain defects and prevent degradation of the quality of an image formed on the recording paper PP.

The absolute value of the difference between 0.5 times the natural vibration period Tc and the time period from the start of the expansion element to the start time of the discharge element in the discharge pulse PLX chronologically located at the end among the N number of discharge pulses PLX is smaller than the absolute value of the difference between 0.5 times the natural vibration period Tc and the time period from the start of the expansion element to the start of the discharge element in the discharge pulses PLX chronologically located at other than the end among the N number of discharge pulses PLX.

By setting the time period from the start of the expansion element to the start time of the discharge element in a discharge pulse PL closer to 0.5 times the natural vibration period Tc, the discharge speed of the ink droplet discharged by the discharge pulse PL can be increased. According to the first embodiment, therefore, the discharge speed of the ink droplet by the discharge pulse PLX chronologically located at the end is set higher than the discharge speed of the ink droplets by the discharge pulses PLX chronologically located at other than the end, so that the ink droplet by the discharge pulse PLX chronologically located at the end can be easily combined with the ink droplets by the discharge pulses PLX chronologically located at other than the end.

The absolute value of the potential change per unit time, of the discharge element of the discharge pulse PLX chronologically located at the end among the N number of discharge pulses PLX is greater than that of the discharge pulses PLX chronologically located at other than the end among the N number of discharge pulses PLX. In other words, the potential of the discharge element of the discharge pulse PLX chronologically located at the end changes more rapidly than that of the discharge pulses PLX chronologically located at other than the end.

When the potential of the discharge element of the discharge pulse PL is configured to change rapidly, the discharge speed of the ink droplet discharged by the discharge pulse PL can be increased. According to the first embodiment, therefore, the ink droplet by the discharge pulse PLX chronologically located at the end can be easily combined with the ink droplets by the discharge pulses PLX chronologically located at other than the end, compared to a configuration in which the potential of the discharge element of the discharge pulses PLX chronologically located at other than the end changes more rapidly than that of the discharge pulse PLX chronologically located at the end.

The ink jet printer 1 according to the first embodiment can be considered as executing a liquid discharge method of a liquid discharge apparatus including: the liquid discharge head HU, which includes the discharge sections D each having: the nozzle Nz discharging liquid as an ink droplet; the pressure chamber 320 communicating with the nozzle Nz; and the piezo-element PZ altering the pressure of ink within the pressure chamber 320 according to the driving signal Com; the driving signal generation circuit 2 generating the driving signal Com; the temperature detector 4 detecting temperature; and the controller 6 controlling the driving signal generation circuit 2. The controller 6 acquires the temperature information KT indicating the temperature from the temperature detector 4; and when the temperature information KT indicates the normal temperature, causes the driving signal generation circuit 2 to generate the driving signal Com including the first driving waveform PX to be supplied to the piezo-element PZ.

According to the first embodiment, the ink jet printer 1 is able to generate the driving signal Com including the first driving waveform PX suitable for the normal temperature when the temperature information KT indicates the normal temperature.

2. Modification

The embodiment illustrated above can be variously modified. Specific modifications are illustrated below. Any two or more modifications selected from the following examples can be properly combined without contradicting each other.

2-1. First Modification

In the first embodiment, all of the first driving waveform PX or all of the second driving waveform PY that are possibly included in the driving signal Com are supplied to the piezo-element PZ. However, a part of the first driving waveform PX or a part of the second driving waveform PY may be supplied to the piezo-element PZ.

Figure 10:
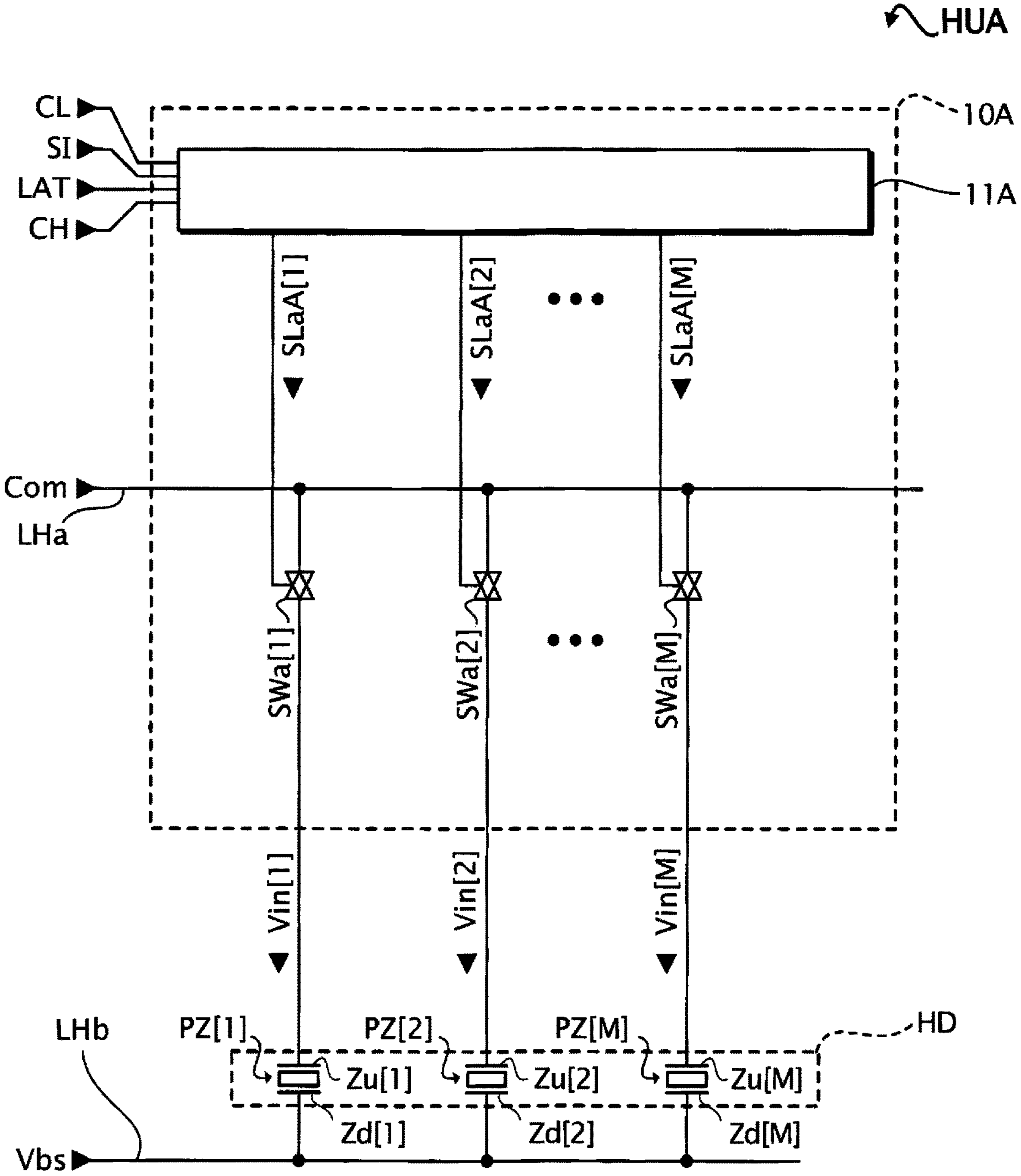
FIG. 10 is a block diagram illustrating an example configuration of a liquid discharge head according to a first modification.

FIG. 10 is a block diagram illustrating an example configuration of a liquid discharge head HUA according to a first modification. The liquid discharge head HUA is different from the liquid discharge head HU in including a switching circuit 10A instead of the switching circuit 10. The switching circuit 10A is different from the switching circuit 10 in including a connection status specifying circuit 11A instead of the connection status specifying circuit 11. The connection status specifying circuit 11A is different from the connection status specifying circuit 11 in further receiving a change signal CH from the controller 6 according to the first modification and outputting connection status specifying signals SLaA[1] to SLaA[M] instead of the connection status specifying signals SLa[1] to SLa[M].

Figure 11:
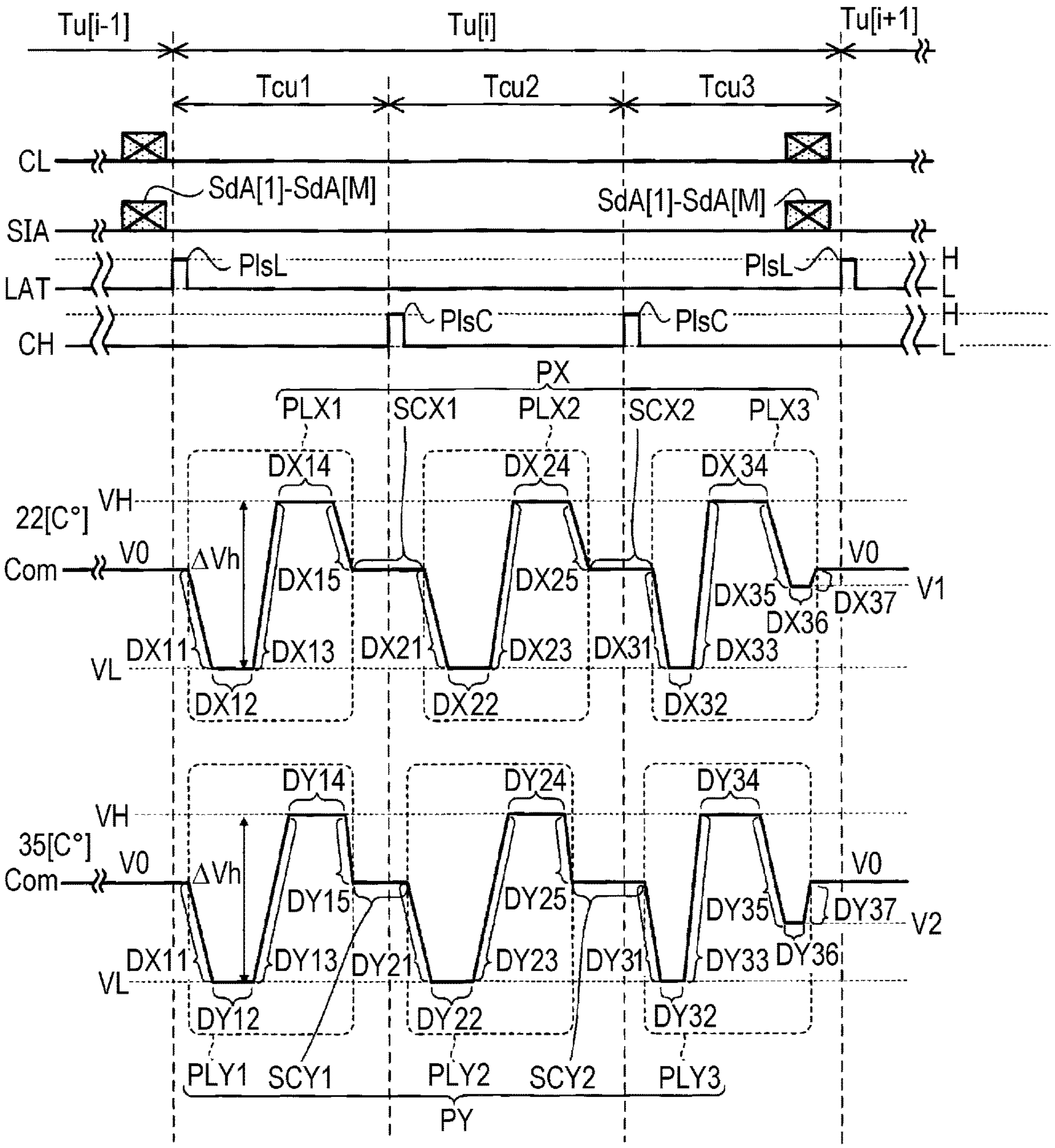
FIG. 11 is a timing chart diagram for explaining the operation of the ink jet printer according to the first modification in the recording period.

FIG. 11 is a timing chart for explaining the operation of the ink jet printer 1 according to the first modification during the recording period Tu[i].

The controller 6 according to the first modification is different from the controller 6 according to the first embodiment in outputting a printing signal SIA instead of the printing signal SI and outputting the change signal CH including pulses PlsC. In the following description of the first modification, the controller 6 according to the first modification is sometimes just referred to as the controller 6.

As illustrated in FIG. 11, the controller 6 separates the recording period Tu[i] into a control period Tcu1, a control period Tcu2, and a control period Tcu3 with the pulses PlsC included in the change signal CH.

As seen from FIG. 11, when the driving signal Com includes the first driving waveform PX, the discharge pulse PLX1 is provided in the control period Tcu1, the discharge pulse PLX2 is provided in the control period Tcu2, and the discharge pulse PLX3 is provided in the control period Tcu3. When the driving signal Com includes the second driving waveform PY, the discharge pulse PLY1 is provided in the control period Tcu1, the discharge pulse PLY2 is provided in the control period Tcu2, and the discharge pulse PLY3 is provided in the control period Tcu3. In other words, the time at which the first pulse PlsC of a certain recording period Tu[i] rises is included in the duration of the connection component SCX1 and is included in the duration of the connection component SCY1. In a similar manner, the time at which the second pulse PlsC of a certain recording period Tu[i] rises is included in the duration of the connection component SCX2 and is included in the duration of the connection component SCY2. In still other words, in order to properly separate the control periods Tcu1, Tcu2, and Tcu3 even when the driving signal Com includes any one of the first driving waveform PX or the second driving waveform PY, the durations of the connection components SCX1 and SCY1 include time periods overlapping each other, and the durations of the connection components SCX2 and SCY2 include time periods overlapping each other.

The printing signal SIA includes individual specifying signals SdA[1] to SdA[M], which specify the driving mode of the respective discharge sections D[1] to D[M] in each recording period Tu. In the process of executing the print processing in the recording period Tu[i], as illustrated in FIG. 11, before starting the recording period Tu[i], the controller 6 supplies the printing signal SIA including the individual specifying signals SdA[1] to SdA[M] to the connection status specifying circuit 11A in synchronization with the clock signal CL. In this case, for any m from 1 to M, the connection status specifying circuit 11A generates the connection status specifying signal SLaA[m] based on the individual specifying signal SdA[m] for the recording period Tu[i].

The individual specifying signal SdA[m] is a signal specifying any one of the following three driving modes α1, α2, and α3 for each recording period Tu. In the first modification, the individual specifying signal SdA[m] is assumed to be a 2-bit digital signal by way of example.

FIG. 12 is a diagram for explaining the three driving modes that can be taken by the individual specifying signal SdA[m]. The individual specifying signal SdA[m] indicates any one of values, a value (1, 1) representing the driving mode α1, a value (0, 1) representing the driving mode α2, or a value (0, 0) representing the driving mode α3.

When the individual specifying signal SdA[m] indicates the driving mode α1, the connection status specifying circuit 11A sets the connection status specifying signal SLaA[m] high in the control periods Tcu1, Tcu2, and Tcu3. When the individual specifying signal SdA[m] indicates the driving mode α2, the connection status specifying circuit 11A sets the connection status specifying signal SLaA[m] low in the control period Tcu1 and sets the connection status specifying signal SLaA[m] high in the control periods Tcu2 and Tcu3. When the individual specifying signal SdA[m] indicates the driving mode α3, the connection status specifying circuit 11A sets the connection status specifying signal SLaA[m] low in the control periods Tcu1, Tcu2, and Tcu3.

When the individual specifying signal SdA[m] specifies the driving mode α1 for the discharge section D[m], the connection status specifying circuit 11A sets the connection status specifying signal SLaA[m] high in the recording period Tu. The discharge section D[m] discharges three ink droplets in the recording period Tu, and the three ink droplets are combined in the air. Specifically, when the temperature information KT indicates the normal temperature, the supply driving signal Vin[m] includes three discharge pulses PLX. The discharge section D[m] discharges three ink droplets by the three discharge pulses PLX in the recording period Tu. When the temperature information KT indicates the high temperature, the discharge section D[m] discharges three ink droplets by the three discharge pulses PLY in the recording period Tu.

When the individual specifying signal SdA[m] specifies the driving mode α2 for the discharge section D[m], the connection status specifying circuit 11A sets the connection status specifying signal SLaA[m] low in the control period Tcu1 and sets the connection status specifying signal SLaA[m] high in the control periods Tcu2 and Tcu3. In this case, the discharge section D[m] discharges two ink droplets in the recording period Tu, and these two ink droplets are combined in the air. Specifically, when the temperature information KT indicates the normal temperature, the supply driving signal Vin[m] includes the discharge pulses PLX2 and PLX3. The discharge section D[m] discharges two ink droplets by the discharge pulses PLX2 and PLX3 in the recording period Tu. When the temperature information KT indicates the high temperature, the discharge section D[m] discharges two ink droplets by the discharge pulses PLY2 and PLY3 in the recording period Tu.

When the individual specifying signal SdA[m] specifies the driving mode α3 for the discharge section D[m], the connection status specifying circuit 11A sets the connection status specifying signal SLaA[m] low in the recording period Tu. In this case, the discharge section D[m] does not discharge any ink droplet in the recording period Tu.

For example, the discharge section D is able to discharge a 37 [ng] ink droplet in the driving mode α1. [ng] indicates nanogram. The discharge section D is able to discharge a 24 [ng] ink droplet in the driving mode α2. The discharge section D is thus able to discharge ink in the driving mode α1 1.5 times as much as in the driving mode α2. According to the first modification, by altering the driving mode of the discharge section D, it is possible to change the size of dots formed on the recording paper PP while properly changing the driving waveform depending on the temperature.

In the first modification, the individual specifying signal SdA selects any one of the three driving modes of the discharge section D. However, the driving modes of the discharge section D are not limited to the aforementioned three driving modes. For example, the individual specifying signal SdA may be configured to select a mode in which ink droplets are discharged by the first and third discharge pulses PL in the recording period Tu.

2-2. Second Modification

In the aforementioned embodiment, the numbers N of the discharge pulses PL included in the first driving waveform PX and the second driving waveform PY are three but may be four or more. Furthermore, the first modification may be applied thereto. Specifically, the driving modes of the discharge section D may include a mode in which ink droplets are discharged by one or plural discharge pulses PL among the four or more discharge pulses PL. For example, a driving waveform including n3 number of discharge pulses PL among the four or more discharge pulses PL and n3-1 number of connection components connecting two adjacent discharge pulses PL among the n3 number of discharge pulses PL may be supplied to the piezo-electric element PZ. Herein, n3 is not less than three. In the second modification, the driving waveform including the n3 number of discharge pulses PL and the n3-1 number of connection components is an example of the “first driving waveform”.

2-3. Third Modification

In the aforementioned embodiment, the time period from the start of the discharge pulse PLY chronologically located at the top among the N number of discharge pulses PLY to the end of the discharge pulse PLY chronologically located at the end is shorter than the time period from the start of the discharge pulse PLX chronologically located at the top among the N number of discharge pulses PLX to the end of the discharge pulse PLX chronologically located at the end. However, the present disclosure is not limited thereto. For example, the time period from the start of the discharge pulse PLY chronologically located at the top to the end of the discharge pulse PLY chronologically located at the end may be longer than the time period from the start of the discharge pulse PLX chronologically located at the top to the end of the discharge pulse PLX chronologically located at the end.

2-4. Fourth Modification

In the aforementioned embodiment, the time period from the start of the discharge pulse PLY chronologically located at the top among the N number of discharge pulses PLY to the start of the discharge pulse PLY chronologically located at the end is shorter than the time period from the start of the discharge pulse PLX chronologically located at the top among the N number of discharge pulses PLX to the start of the discharge pulse PLX chronologically located at the end. However, the present disclosure is not limited thereto. For example, the time period from the start of the discharge pulse PLY chronologically located at the top to the start of the discharge pulse PLY chronologically located at the end may be longer than the time period from the start of the discharge pulse PLX chronologically located at the top to the start of the discharge pulse PLX chronologically located at the end.

2-5. Fifth Modification

In the aforementioned embodiment, the potential of the vibration control element of the n1-th discharge pulse PLY changes more rapidly than that of the n1-th discharge pulse PLX. Herein, n1 is an integer not less than 1 and not greater than N. However, the potential of the vibration control element of the n1-th discharge pulse PLX may change more rapidly than that of the n1-th discharge pulse PLY.

2-6. Sixth Modification

In the aforementioned embodiment, the potential of the discharge element of the n2-th discharge pulse PLY changes more slowly than that of the n2-th discharge pulse PLX. Herein, n2 is an integer not less than 1 and not greater than N−1. However, the potential of the discharge element of the n2-th discharge pulse PLY may change more rapidly than that of the n2-th discharge pulse PLX.

2-7. Seventh Modification

In the aforementioned embodiment, N number of ink droplets in one-to-one correspondence to the N number of discharge pulses PL are combined before landing on the recording paper PP. However, the present disclosure is not limited thereto. For example, it is not necessary that all the N number of ink droplets are combined before landing on the recording paper PP. Furthermore, some of the N number of ink droplets may be combined before landing on the recording paper PP while the other ink droplets are not combined before landing on the recording paper PP.

2-8. Eighth Modification

In the aforementioned embodiment, the absolute value of the difference between 0.5 times the natural vibration period Tc and the time period from the start of the expansion element to the start of the discharge element in the discharge pulse PLX chronologically located at the end is smaller than that between 0.5 times the natural vibration period Tc and the time period from the start of the expansion element to the start of the discharge element in the discharge pulses PLX chronologically located at other than the end. However, the present disclosure is not limited thereto. For example, the absolute value of the difference between 0.5 times the natural vibration period Tc and the time period from the start of the expansion element to the start of the discharge element in the discharge pulse PLX chronologically located at the end may be greater than that between 0.5 times the natural vibration period Tc and the time period from the start of the expansion element to the start of the discharge element in the discharge pulses PLX chronologically located at other than the end.

2-9. Ninth Modification

In the aforementioned embodiment, the potential of the discharge element of the discharge pulse PLX chronologically located at the end changes more rapidly than the potential of the discharge element of the discharge pulses PLX chronologically located at other than the end. However, the potential of the discharge element of the discharge pulses PLX chronologically located at other than the end may change more rapidly than that of the discharge element of the discharge pulse PLX chronologically located at the end.

2-10. 10th Modification

In the aforementioned embodiment, when the temperature detected by the temperature detector 4 is the high temperature, the driving signal Com includes the second driving waveform PY. However, the driving signal Com does not need to include the second driving waveform PY.

2-11. 11th Modification

In the aforementioned embodiment, instead of the piezo-element PZ, the liquid discharge head HU may include a heating element that heats ink within the pressure chamber 320 to form air bubbles within the pressure chamber 320. In the 11th modification, the heating element is an example of the "driving element".

2-12. 12th Modification

The aforementioned embodiment illustrates the serial ink jet printer 1, which reciprocates the liquid discharge head HU along the X-axis. The present disclosure is not limited to such a configuration. The liquid discharge apparatus may be a line-type ink jet printer in which plural nozzles Nz are distributed across the entire width of the recording paper PP.

2-13. Other Modification

The aforementioned liquid discharge apparatus is applicable to facsimiles, copiers, or other various devices, in addition to devices for printing. The liquid discharge apparatus of the present disclosure is not limited to printing use. For example, a liquid discharge apparatus discharging a solution of color material is used as a manufacturing apparatus for forming color filters for liquid display apparatuses. A liquid discharge apparatus discharging a solution of conductive material is used as a manufacturing apparatus forming wires and electrodes of circuit boards.

3. Note

The following configurations can be understood from the embodiment illustrated above.

A liquid discharge apparatus according to a first aspect that is a preferable aspect includes a liquid discharge head including a discharge section having: a nozzle discharging liquid as a liquid droplet; a pressure chamber communicating with the nozzle; and a driving element altering the pressure of the liquid within the pressure chamber according to a driving signal; a driving signal generator generating the driving signal; and a temperature detector detecting temperature. When the temperature detected by the temperature detector is a first temperature, the driving signal configured to include a first driving waveform that is configured to be supplied to the driving element when the temperature detected by the temperature detector is the first temperature. The first driving waveform includes within one cycle, N number of first discharge pulses arranged chronologically and N−1 number of first connection components each connecting two adjacent first discharge pulses among the N number of first discharge pulses where N is not less than three. Each of the N number of first discharge pulses is a pulse whose potential changes to alter the pressure of the liquid within the pressure chamber such that the liquid droplet can be discharged from the nozzle. Each of the N−1 number of first connection components is a component maintained at a constant potential for a time period longer than or equal to 0.6 times a natural vibration period of the pressure chamber.

According to the first aspect, the durations of the N−1 number of first connection components are each longer than or equal to 0.6 times the natural vibration period at the first temperature. This can reduce the influence of residual vibration due to the n-th first discharge pulse on the discharge by the (n+1)-th first discharge pulse. Herein, n is an integer from 1 to N−1. Compared to a configuration in which the durations of the N−1 number of first connection components are each shorter than 0.6 times the natural vibration period, it is possible to reduce deterioration of the discharge performance by the (n+1)-th first discharge pulse, thus preventing degradation of the quality of an image formed on the medium.

In a second aspect that is specific example of the first aspect, when the temperature detected by the temperature detector is a second temperature higher than the first temperature, the driving signal includes a second driving waveform that is configured to be supplied to the driving element when the temperature detected by the temperature detector is the second temperature, the second driving waveform includes within one cycle, N number of second discharge pulses arranged chronologically and N−1 number of second connection components connecting two adjacent second discharge pulses among the N number of second discharge pulses, each of the N−1 number of second connection components is a component maintained at a constant potential, the duration of the second connection component immediately before the second discharge pulse chronologically located at the end among the N number of second discharge pulses is longer than the duration of the first connection component immediately before the first discharge pulse chronologically located at the end among the N number of first discharge pulses, and the duration of the second connection component immediately before the second discharge pulse that comes before the second discharge pulse chronologically located at the end among the N number of second discharge pulses is shorter than the duration of the first connection component immediately before the first discharge pulse that comes before the first discharge pulse chronologically located at the end among the N number of first discharge pulses.

As the liquid temperature increases, the attenuation of residual vibration remaining after the liquid droplet is discharged decreases. Among discharge speeds of the N number of liquid droplets by the N number of second discharge pulses, the discharge speed of the liquid droplet discharged last affects most significantly on the accuracy of the landing position of the liquid droplet formed by combining of the N number of liquid droplets. According to the second aspect, in the second temperature state where the liquid droplet temperature is higher than normal temperature, the duration of the second connection component chronologically located at the end in the second driving waveform is increased. This can prevent the decrease in accuracy of the landing position of the liquid droplet formed by combining of the N number of liquid droplets. According to the second aspect, on the other hand, the duration of the second connection components chronologically located at other than the end in the second driving waveform is shortened. The one cycle length of the second driving waveform can thereby be set equal to the one cycle length of the first driving waveform.

In a third aspect that is specific example of the second aspect, the time period from the start of the second discharge pulse chronologically located at the top among the N number of second discharge pulses to the end of the second discharge pulse chronologically located at the end is shorter than the time period from the start of the first discharge pulse chronologically located at the top among the N number of first discharge pulses to the end of the first discharge pulse chronologically located at the end.

According to the third aspect, compared to a configuration in which the time period from the start of the second discharge pulse chronologically located at the top to the end of the second discharge pulse chronologically located at the end is longer than the time period from the start of the first discharge pulse chronologically located at the top to the end of the first discharge pulse chronologically located at the end, it is possible to prevent deterioration of the discharge performance of liquid droplets discharged by the N number of second discharge pulses in the subsequent cycle of the second driving waveform.

In a fourth aspect that is specific example of the second aspect, the time period from the start of the second discharge pulse chronologically located at the top among the N number of second discharge pulses to the start of the second discharge pulse chronologically located at the end is shorter than the time period from the start of the first discharge pulse chronologically located at the top among the N number of first discharge pulses to the start of the first discharge pulse chronologically located at the end.

Compared to a configuration in which the time period from the start of the second discharge pulse chronologically located at the top to the start of the second discharge pulse chronologically located at the end is longer than the time period from the start of the first discharge pulse chronologically located at the top to the start of the first discharge pulse chronologically located at the end, the liquid droplet by the second discharge pulse chronologically located at the end can be discharged earlier. This facilitates combining of the liquid droplet by the second discharge pulse chronologically located at the end with the liquid droplets discharged earlier.

In a fifth aspect that is specific example of the second aspect, the N number of first discharge pulses and the N number of second discharge pulses each include an expansion element whose potential changes to expand the volume of the pressure chamber, a discharge element contracting the expanded volume of the pressure chamber to discharge a liquid droplet from the nozzle, and a vibration control element contracting the pressure chamber to suppress pressure vibration that remains in liquid within the pressure chamber after the liquid droplet is discharged from the nozzle, and the absolute value of the potential change per unit time, of the vibration control element of the n1-th second discharge pulse from the start of one cycle of the N number of second discharge pulses is greater than the absolute value of the potential change per unit time, of the vibration control element of the n1-th first discharge pulse from the start of one cycle of the N number of first discharge pulses where the n1 is an integer not less than 1 and not greater than N.

According to the fifth aspect, compared to a configuration where the potential of the vibration control element of the n1-th first discharge pulse PLX changes more rapidly than that of the vibration control element of the n1-th second discharge pulse, it is possible to attenuate the residual vibration due to the n1-th second discharge pulse at the second temperature.

In a sixth aspect that is specific example of the second aspect, the N number of first discharge pulses and the N number of second discharge pulses each include an expansion element whose potential changes to expand the volume of the pressure chamber and a discharge element contracting the expanded volume of the pressure chamber to discharge a liquid droplet from the nozzle, and the absolute value of the potential change per unit time, of the discharge element of the n2-th second discharge pulse from the start of one cycle of the N number of second discharge pulses is smaller than the absolute value of the potential change per unit time, of the discharge element of the n2-th first discharge pulse from the start of one cycle of the N number of first discharge pulses where the n2 is an integer not less than 1 and not greater than N−1.

According to the sixth aspect, compared to a configuration in which the potential of the discharge element of the n2-th second discharge pulse changes more rapidly than the potential of the discharge element of the n2-th first discharge pulse, it is possible to facilitate combining of the liquid droplet by the n2-th second discharge pulse and the liquid droplet by the (n2+1)-th second discharge pulse and reduce the residual vibration due to the n2-th second discharge pulse.

In a seventh aspect that is specific example of the first aspect, the liquid discharge head discharges a liquid droplet to a medium, and N number of liquid droplets that are discharged from the nozzle in one-to-one correspondence to the N number of first discharge pulses by the first driving waveform being supplied to the driving element are combined before landing on the medium.

According to the seventh aspect, compared to a configuration in which the N number of liquid droplets are not combined, it is possible to reduce occurrence of wood grain defects and thereby prevent degradation of the quality of an image formed on the medium.

In an eighth aspect that is specific example of the seventh aspect, the N number of first discharge pulses each include an expansion element whose potential changes to expand the volume of the pressure chamber and a discharge element contracting the expanded volume of the pressure chamber to discharge a liquid droplet from the nozzle, and the absolute value of the difference between 0.5 times the natural vibration period of the pressure chamber and the time period from the start of the expansion element to the start of the discharge element in the first discharge pulse chronologically located at the end among the N number of first discharge pulses is smaller than the absolute value of the difference between 0.5 times the natural vibration period of the pressure chamber and the time period from the start of the expansion element to the start of the discharge element in the first discharge pulses chronologically located at other than the end among the N number of first discharge pulses.

According to the eighth aspect, the discharge speed of the liquid droplet by the first discharge pulse chronologically located at the end is higher than the discharge speed of the liquid droplets by the first discharge pulses chronologically located at other than the end. This can facilitate combining of the liquid droplet by the first discharge pulse chronologically located at the end with liquid droplets by the first discharge pulses chronologically located at other than the end.

In a ninth aspect that is specific example of the seventh aspect, the N number of first discharge pulses each include an expansion element whose potential changes to expand the volume of the pressure chamber and a discharge element contracting the expanded volume of the pressure chamber to discharge a liquid droplet from the nozzle, and the absolute value of the potential change per unit time, of the discharge element of the first discharge pulse chronologically located at the end among the N number of first discharge pulses is greater than the absolute value of the potential change per unit time, of the discharge element of the first discharge pulses chronologically located at other than the end among the N number of first discharge pulses.

According to the ninth aspect, compared to a configuration in which the potential of the discharge element of the first discharge pulses chronologically located at other than the end changes more rapidly than that of the discharge element of the first discharge pulse chronologically located at the end, it is possible to facilitate combining of the liquid droplet by the first discharge pulse chronologically located at the end with liquid droplets by the first discharge pulses chronologically located at other than the end.

A liquid discharge method according to a tenth aspect that is a preferable aspect is a liquid discharge method of a liquid discharge apparatus including: a liquid discharge head including a discharge section having a nozzle discharging liquid as a liquid droplet, a pressure chamber communicating with the nozzle, and a driving element altering the pressure of the liquid within the pressure chamber according to a driving signal; a driving signal generator generating the driving signal; a temperature detector detecting temperature; and a controller controlling the driving signal generator. The controller acquires temperature information indicating the temperature from the temperature detector. The controller causes the driving signal generator to generate the driving signal including a first driving waveform that is to be supplied to the driving element when the temperature indicated by the temperature information is a first temperature. The first driving waveform includes, within one cycle, N number of first discharge pulses arranged chronologically and N−1 number of first connection components each connecting two adjacent first discharge pulses among the N number of first discharge pulses where N is not less than three. Each of the N number of first discharge pulses is a pulse whose potential changes to alter the pressure of the liquid within the pressure chamber such that the liquid droplet can be discharged from the nozzle. Each of the N−1 number of first connection components is a component maintained at a constant potential for a time period longer than or equal to 0.6 times a natural vibration period of the pressure chamber.

According to the tenth aspect, it is possible to provide the same effects as the first aspect.

What is claimed is:

1. A liquid discharge apparatus, comprising:

a liquid discharge head including a discharge section having:

a nozzle discharging liquid as a liquid droplet;

a pressure chamber communicating with the nozzle; and a driving element that is configured to effect a change in a pressure of the liquid within the pressure chamber according to a driving signal;

a driving signal generator that is configured to generate the driving signal; and a temperature detector that is configured to detect temperature, wherein when the temperature detected by the temperature detector is a first temperature, the driving signal includes a first driving waveform that is configured to be supplied to the driving element when the temperature detected by the temperature detector is the first temperature, the first driving waveform includes within one cycle, N number of first discharge pulses arranged chronologically and N−1 number of first connection components each connecting two adjacent first discharge pulses among the N number of first discharge pulses where N is not less than three, each of the N number of first discharge pulses is a pulse whose potential changes to effect a change in the pressure of the liquid within the pressure chamber such that the liquid droplet can be discharged from the nozzle, each of the N−1 number of first connection components is a component maintained at a constant potential for a time period longer than or equal to 0.6 times a natural vibration period of the pressure chamber, when the temperature detected by the temperature detector is a second temperature higher than the first temperature, the driving signal includes a second driving waveform that is configured to be supplied to the driving element when the temperature detected by the temperature detector is the second temperature, the second driving waveform includes within one cycle, N number of second discharge pulses arranged chronologically and N−1 number of second connection components connecting two adjacent second discharge pulses among the N number of second discharge pulses, each of the N−1 number of second connection components is a component maintained at a constant potential, duration of a second connection component immediately before a second discharge pulse chronologically located at an end among the N number of second discharge pulses is longer than duration of a first connection component immediately before a first discharge pulse chronologically located at an end among the N number of first discharge pulses, and duration of a second connection component immediately before a second discharge pulse that comes before the second discharge pulse chronologically located at the end among the N number of second discharge pulses is shorter than duration of a first connection component immediately before a first discharge pulse that comes before the first discharge pulse chronologically located at the end among the N number of first discharge pulses.

2. The liquid discharge apparatus according to claim 1, wherein a time period from a start of a second discharge pulse chronologically located at a top among the N number of second discharge pulses to an end of the second discharge pulse chronologically located at the end is shorter than a time period from a start of a first discharge pulse chronologically located at a top among the N number of first discharge pulses to an end of the first discharge pulse chronologically located at the end.

3. The liquid discharge apparatus according to claim 1, wherein a time period from a start of a second discharge pulse chronologically located at a top among the N number of second discharge pulses to a start of the second discharge pulse chronologically located at the end is shorter than a time period from a start of a first discharge pulse chronologically located at a top among the N number of first discharge pulses to a start of the first discharge pulse chronologically located at the end.

4. The liquid discharge apparatus according to claim 1, wherein the N number of first discharge pulses and the N number of second discharge pulses each include an expansion element whose potential changes to expand a volume of the pressure chamber, a discharge element contracting the expanded volume of the pressure chamber to discharge a liquid droplet from the nozzle, and a vibration control element expanding the pressure chamber to suppress pressure vibration that remains in liquid within the pressure chamber after the liquid droplet is discharged from the nozzle, and an absolute value of a potential change per unit time, of the vibration control element of a n1-th second discharge pulse from a start of one cycle of the N number of second discharge pulses is greater than an absolute value of a potential change per unit time, of the vibration control element of a n1-th first discharge pulse from a start of one cycle of the N number of first discharge pulses where the n1 is an integer not less than 1 and not greater than N.

5. The liquid discharge apparatus according to claim 1, wherein the N number of first discharge pulses and the N number of second discharge pulses each include an expansion element whose potential changes to expand a volume of the pressure chamber and a discharge element contracting the expanded volume of the pressure chamber to discharge a liquid droplet from the nozzle, and an absolute value of a potential change per unit time, of the discharge element of a n2-th second discharge pulse from a start of one cycle of the N number of second discharge pulses is smaller than an absolute value of a potential change per unit time, of the discharge element of a n2-th first discharge pulse from a start of one cycle of the N number of first discharge pulses where the n2 is an integer not less than 1 and not greater than N−1.

6. The liquid discharge apparatus according to claim 1, wherein the liquid discharge head discharges a liquid droplet to a medium, and N number of liquid droplets that are discharged from the nozzle in one-to-one correspondence to the N number of first discharge pulses by the first driving waveform being supplied to the driving element are combined before landing on the medium.

7. The liquid discharge apparatus according to claim 6, wherein the N number of first discharge pulses each include an expansion element whose potential changes to expand a volume of the pressure chamber and a discharge element contracting the expanded volume of the pressure chamber to discharge a liquid droplet from the nozzle, and an absolute value of a difference between 0.5 times the natural vibration period of the pressure chamber and a time period from a start of the expansion element to a start of the discharge element in a first discharge pulse chronologically located at an end among the N number of first discharge pulses is smaller than an absolute value of a difference between 0.5 times the natural vibration period of the pressure chamber and a time period from a start of the expansion element to a start of the discharge element in first discharge pulses chronologically located at other than the end among the N number of first discharge pulses.

8. The liquid discharge apparatus according to claim 6, wherein the N number of first discharge pulses each include an expansion element whose potential changes to expand a volume of the pressure chamber and a discharge element contracting the expanded volume of the pressure chamber to discharge a liquid droplet from the nozzle, and an absolute value of a potential change per unit time, of the discharge element of a first discharge pulse chronologically located at an end among the N number of first discharge pulses is greater than an absolute value of a potential change per unit time, of the discharge element of first discharge pulses chronologically located at other than the end among the N number of first discharge pulses.

9. A liquid discharge method of a liquid discharge apparatus including:

a liquid discharge head including a discharge section having a nozzle discharging liquid as a liquid droplet, a pressure chamber communicating with the nozzle, and a driving element that is configured to effect a change in a pressure of the liquid within the pressure chamber according to a driving signal;

a driving signal generator that is configured to generate the driving signal; and a temperature detector that is configured to detect temperature, the liquid discharge method comprising:

acquiring temperature information indicating the temperature from the temperature detector; and generating the driving signal including a first driving waveform that is to be supplied to the driving element when the temperature indicated by the temperature information is a first temperature, wherein the first driving waveform includes, within one cycle, N number of first discharge pulses arranged chronologically and N−1 number of first connection components each connecting two adjacent first discharge pulses among the N number of first discharge pulses where N is not less than three, each of the N number of first discharge pulses is a pulse whose potential changes to effect a change in the pressure of the liquid within the pressure chamber such that the liquid droplet can be discharged from the nozzle, each of the N−1 number of first connection components is a component maintained at a constant potential for a time period longer than or equal to 0.6 times a natural vibration period of the pressure chamber, when the temperature detected by the temperature detector is a second temperature higher than the first temperature, the driving signal includes a second driving waveform that is configured to be supplied to the driving element when the temperature detected by the temperature detector is the second temperature, the second driving waveform includes within one cycle, N number of second discharge pulses arranged chronologically and N−1 number of second connection components connecting two adjacent second discharge pulses among the N number of second discharge pulses, each of the N−1 number of second connection components is a component maintained at a constant potential, duration of a second connection component immediately before a second discharge pulse chronologically located at an end among the N number of second discharge pulses is longer than duration of a first connection component immediately before a first discharge pulse chronologically located at an end among the N number of first discharge pulses, and duration of a second connection component immediately before a second discharge pulse that comes before the second discharge pulse chronologically located at the end among the N number of second discharge pulses is shorter than duration of a first connection component immediately before a first discharge pulse that comes before the first discharge pulse chronologically located at the end among the N number of first discharge pulses.

10. A liquid discharge apparatus, comprising:

a liquid discharge head including a discharge section having:

a nozzle discharging liquid as a liquid droplet;

a pressure chamber communicating with the nozzle; and a driving element that is configured to effect a change in a pressure of the liquid within the pressure chamber according to a driving signal;

a driving signal generator that is configured to generate the driving signal; and a temperature detector that is configured to detect temperature, wherein when the temperature detected by the temperature detector is a first temperature, the driving signal includes a first driving waveform that is configured to be supplied to the driving element when the temperature detected by the temperature detector is the first temperature, the first driving waveform includes within one cycle, N number of first discharge pulses arranged chronologically and N−1 number of first connection components each connecting two adjacent first discharge pulses among the N number of first discharge pulses where N is not less than three, each of the N number of first discharge pulses is a pulse whose potential changes to effect a change in the pressure of the liquid within the pressure chamber such that the liquid droplet can be discharged from the nozzle, each of the N−1 number of first connection components is a component maintained at a constant potential for a time period longer than or equal to 0.6 times a natural vibration period of the pressure chamber, the liquid discharge head discharges a liquid droplet to a medium, N number of liquid droplets that are discharged from the nozzle in one-to-one correspondence to the N number of first discharge pulses by the first driving waveform being supplied to the driving element are combined before landing on the medium, the N number of first discharge pulses each include an expansion element whose potential changes to expand a volume of the pressure chamber and a discharge element contracting the expanded volume of the pressure chamber to discharge a liquid droplet from the nozzle, and an absolute value of a potential change per unit time, of the discharge element of a first discharge pulse chronologically located at an end among the N number of first discharge pulses is greater than an absolute value of a potential change per unit time, of the discharge element of first discharge pulses chronologically located at other than the end among the N number of first discharge pulses.

11. The liquid discharge apparatus according to claim 10, wherein an absolute value of a difference between 0.5 times the natural vibration period of the pressure chamber and a time period from a start of the expansion element to a start of the discharge element in the first discharge pulse chronologically located at the end among the N number of first discharge pulses is smaller than an absolute value of a difference between 0.5 times the natural vibration period of the pressure chamber and a time period from a start of the expansion element to a start of the discharge element in first discharge pulses chronologically located at other than the end among the N number of first discharge pulses.

* * * * *